(12) United States Patent
Jeong et al.

(10) Patent No.: US 11,565,405 B2
(45) Date of Patent: Jan. 31, 2023

(54) ELECTRONIC DEVICE INCLUDING ROLLING ELEMENT BETWEEN SPHERICAL HOUSING AND INTERNAL DRIVING DEVICE

(71) Applicant: Samsung Electronics Co., Ltd., Gyeonggi-do (KR)

(72) Inventors: Eunsu Jeong, Gyeonggi-do (KR); Woochul Lee, Gyeonggi-do (KR); Byunghun Cho, Gyeonggi-do (KR); Hyoseok Na, Gyeonggi-do (KR); Yongsang Yun, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 16/790,847

(22) Filed: Feb. 14, 2020

(65) Prior Publication Data

US 2020/0262061 A1 Aug. 20, 2020

(30) Foreign Application Priority Data

Feb. 15, 2019 (KR) .......................... 10-2019-0017842

(51) Int. Cl.
*B64G 1/28* (2006.01)
*B25J 9/12* (2006.01)
(Continued)

(52) U.S. Cl.
CPC ................ *B25J 9/126* (2013.01); *B25J 9/04* (2013.01); *B25J 9/102* (2013.01)

(58) Field of Classification Search
CPC ........ G01C 19/02; B64G 1/285; B64G 1/286; B64G 1/28; A63H 33/005
See application file for complete search history.

(56) References Cited

U.S. PATENT DOCUMENTS 5,692,946 A * 12/1997 Ku ....................... A63H 33/005
473/570
7,305,737 B2 12/2007 Libakken
(Continued)

FOREIGN PATENT DOCUMENTS

JP H03182290 A 8/1991
JP 3794130 B2 7/2006
(Continued)

OTHER PUBLICATIONS

International Search Report dated Jun. 5, 2020.

*Primary Examiner* — Randell J Krug
(74) *Attorney, Agent, or Firm* — Cha & Reiter, LLC

(57) ABSTRACT

An electronic device is disclosed, including: a spherical housing, and a first driving device disposed in the spherical housing and configured to cause a rolling motion of the spherical housing, the first driving device including: first and second wheels contacting an inner spherical surface of the spherical housing, the first and second wheels respectively disposed at opposite sides of an axis of rotation, at least one motor configured to transmit power to the at least one of the first wheel and the second wheel, a balance weight, a first surface that is spaced apart from the axis of rotation in a direction of gravity by balancing of the balance weight, and facing the inner spherical surface, and at least one rolling element disposed between the inner spherical surface and the first surface.

18 Claims, 11 Drawing Sheets

(51) Int. Cl.
*B25J 9/04* (2006.01)
*B25J 9/10* (2006.01)

(56) References Cited

U.S. PATENT DOCUMENTS

| | | | | |
|---|---|---|---|---|
| 2017/0010607 A1* | 1/2017 | Barias | ................ | H04N 5/23219 |
| 2018/0099525 A1* | 4/2018 | Kim | ...................... | A63B 43/04 |
| 2018/0288334 A1* | 10/2018 | Zhang | .................... | B62D 57/02 |

FOREIGN PATENT DOCUMENTS

| KR | 10-2017-0111767 A | 10/2017 |
|---|---|---|
| KR | 10-1853258 B1 | 4/2018 |

* cited by examiner

ELECTRONIC DEVICE INCLUDING ROLLING ELEMENT BETWEEN SPHERICAL HOUSING AND INTERNAL DRIVING DEVICE

CROSS-REFERENCE TO RELATED APPLICATION(S)

This application is based on and claims priority under 35 U.S.C. 119 to Korean Patent Application No. 10-2019-0017842, filed on Feb. 15, 2019, in the Korean Intellectual Property Office, the disclosure of which is herein incorporated by reference in its entirety.

BACKGROUND

1) Field

An embodiment relates to an electronic device including rolling elements disposed between a spherical housing and an internal driving device.

2) Description of Related Art

An electronic device may include a housing and a motor which may operate drive elements which facilitate motion of the electronic device.

The above information is presented as background information only to assist with an understanding of the disclosure. No determination has been made, and no assertion is made, as to whether any of the above might be applicable as prior art with regard to the disclosure.

SUMMARY

In some examples, the electronic device may utilize a spherical housing and an internal driver device disposed inside the spherical housing. The spherical housing may be rotated by the driver, resulting in motion of the electronic device. However, in some cases, harmful friction or damaging impacts may occur in the interaction between the spherical housing and the internal driving device, when the electronic device moves. Friction and impacts between the spherical housing and the internal drive may hinder stable movement of the electronic device.

An embodiment of the present disclosure may provide an electronic device that includes rolling elements disposed between the spherical housing and the internal driving device, which may provide stable movement of the electronic device.

According to an embodiment, an electronic device may include: a spherical housing; and a first driving device disposed in the spherical housing and configured to cause a rolling motion of the spherical housing, the first driving device including: first and second wheels contacting an inner spherical surface of the spherical housing, the first and second wheels respectively disposed at opposite sides of an axis of rotation, at least one motor configured to transmit power to the at least one of the first wheel and the second wheel, a balance weight, a first surface that is spaced apart from the axis of rotation in a direction of gravity by balancing of the balance weight, and facing the inner spherical surface, and at least one rolling element disposed between the inner spherical surface and the first surface.

According to an embodiment, the rolling elements disposed between the spherical housing and the internal driving device support the rotating spherical housing relative to the internal driving device, while maintaining a gap between the internal driving device and the spherical housing, which enables an improvement in stable movement of the electronic device.

In addition, effects obtainable or predicted by certain embodiments will be directly disclosed or implied in the detailed description of the embodiments of the disclosure. For example, various effects predicted according to certain embodiments will be disclosed in the following detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
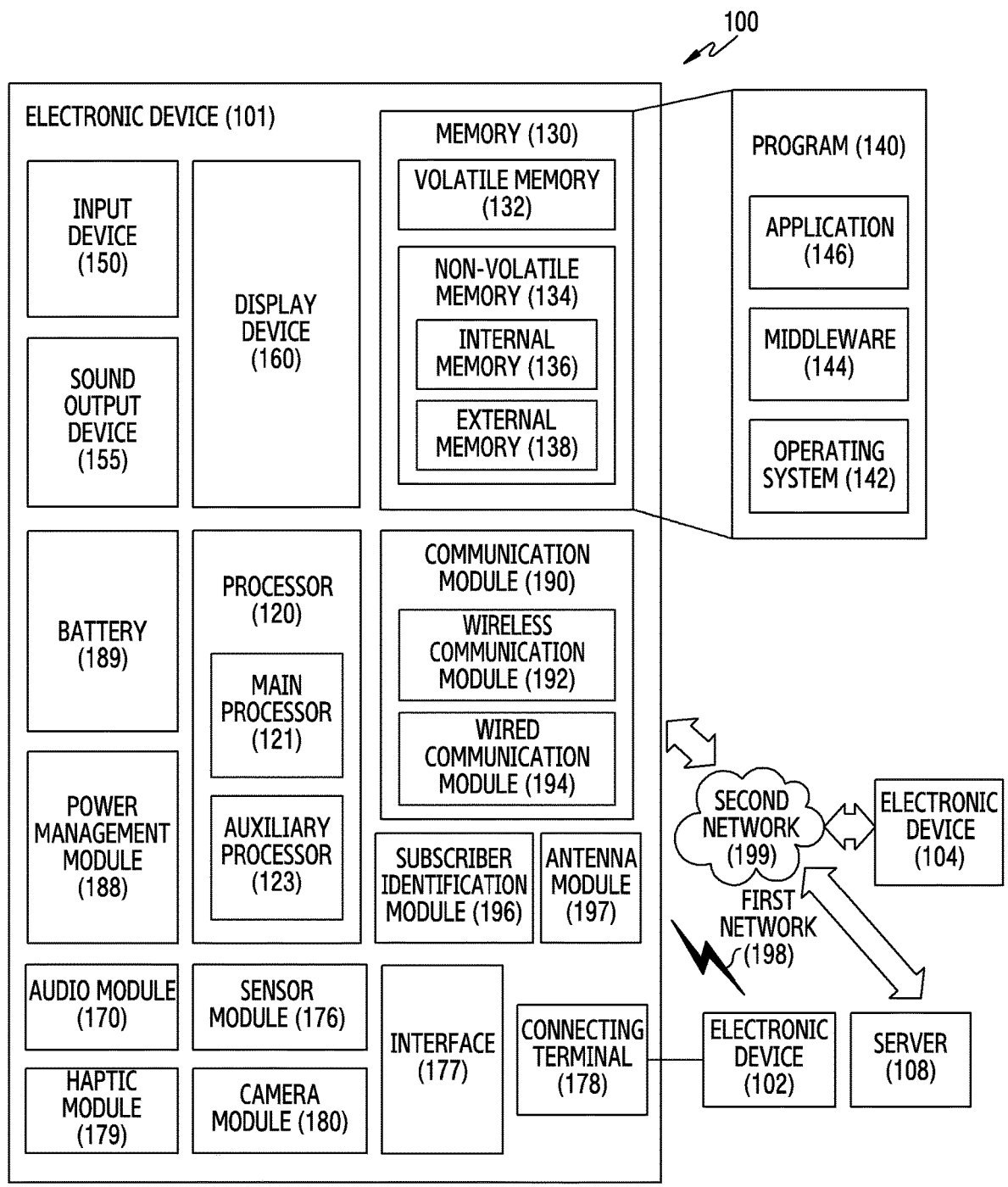
FIG. 1 is a block diagram of an electronic device according to an embodiment in a network environment.

Hereinafter, certain embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereretro. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or #08. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, an electronic device 101 may include a mobile robot. For example, a sensor module 176 (e.g., a proximity sensor) may detect an external object. A camera module 180 (e.g., a depth camera and/or an RGB camera) may continuously acquire vision information. A microphone may acquire voice information about driving of the mobile robot. A processor 120 may include at least one of an application processor (AP), a graphic processor (GP), an image signal processor (ISP), or a codec digital signal processor (DSP) for driving the mobile robot and providing a service. Memory 130 may include object data that may be compared with detected object information. According to certain embodiments, the memory 130 may store map information regarding autonomous travel.

According to an embodiment, the electronic device 101 may be a mobile robot and may include a drive unit. For example, the drive unit be used to mechanically change movement components and other components of the mobile robot. The drive unit may have a shape capable of vertical and horizontal movements or a rotational movement about at least one axis, and the shape may be variously implemented by combining a driving motor.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
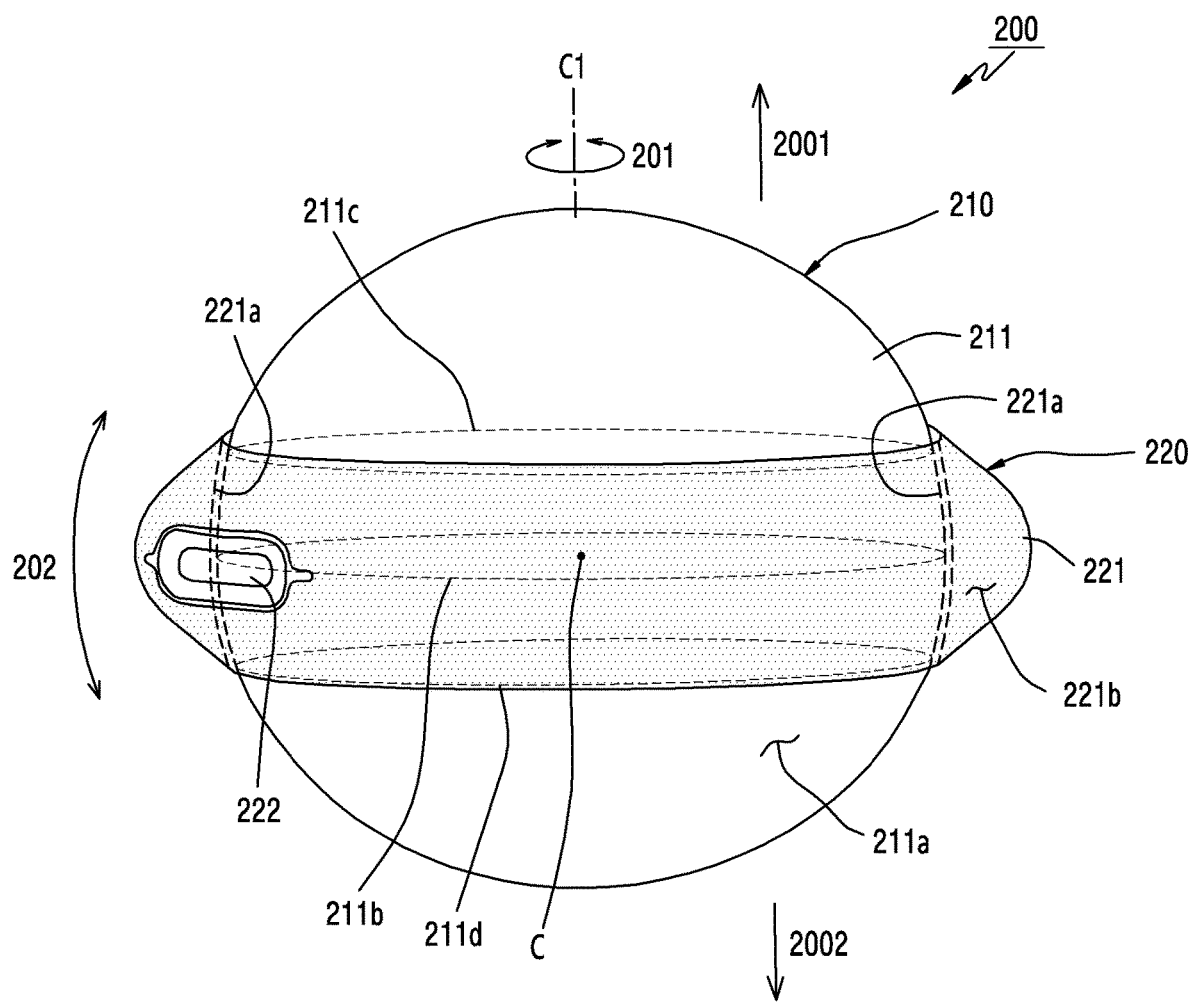
FIG. 2A is a perspective view of an electronic device according to an embodiment and FIG. 2B is a plan view of the electronic device of FIG. 2A.
Figure 2B:
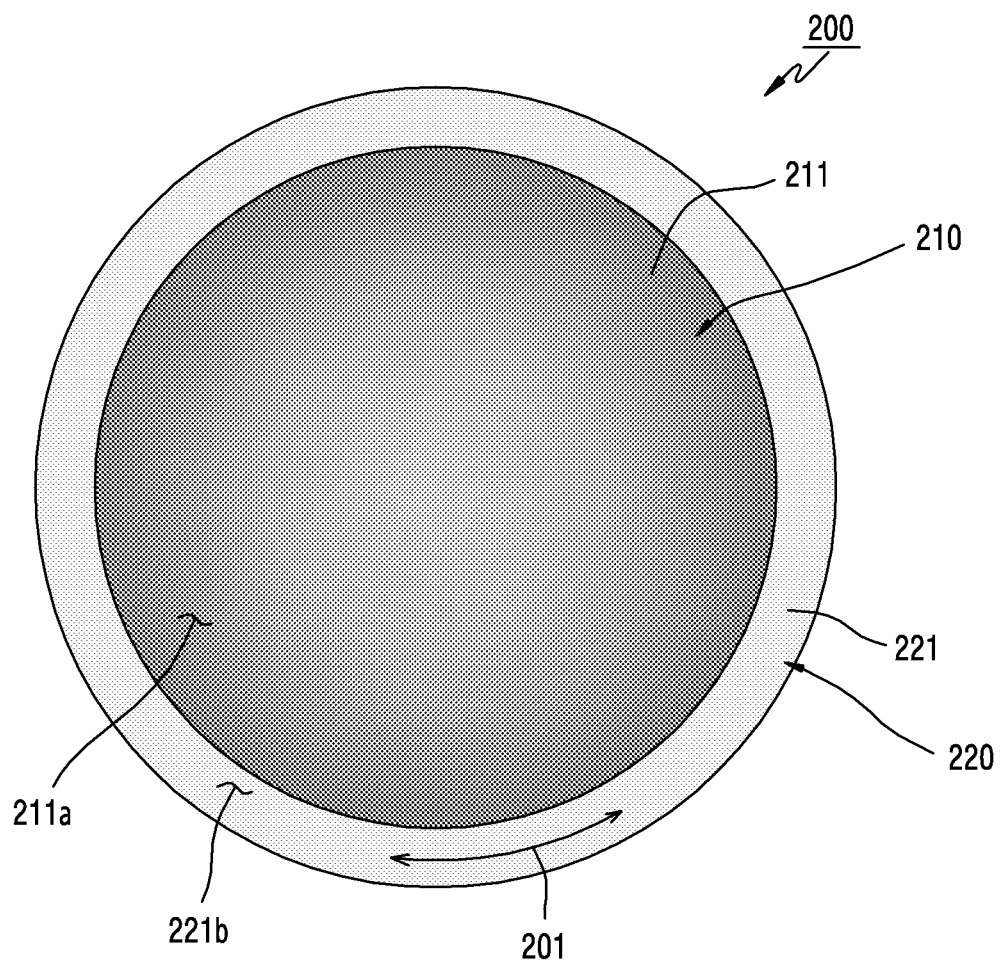

FIG. 2A is a perspective view of an electronic device according to an embodiment. FIG. 2B is a plan view of the electronic device of FIG. 2A.

Referring to FIGS. 2A and 2B, in an embodiment, an electronic device 200 (e.g., the electronic device 101 in FIG. 1) may include a first device 210 and a second device 220. The first device 210 may have a spherical appearance, and may cause the rolling motion of the first device (e.g., the sphere) so as to move the electronic device 200. The second device 220 may be disposed on the surface of the first device 210, and may move on the first device 210 and control the same. According to some embodiments, the second device 220 may be wholly separate from the first device 210 (rather than coupled together mechanically), in which case the electronic device 200 may be interpreted as the first device 210.

According to an embodiment, the first device 210 may include a first housing 211 (e.g., including the spherical surface 211a) and a driving device (or an internal driving device) disposed in the first housing 211. The driving device may facilitate movement by a mechanism or a power mechanism, and may include a first driving device (not illustrated), which is configured to transmit power (e.g., or output torque) to the first housing 211. The first housing 211 may be rotated by the first driving device, and the first device 210 may be moved by rotation of the first housing 211. The first driving device may move independently of the first housing 211, and the first housing 211 may be operatively coupled to the first driving device in various ways.

According to an embodiment, the first device 210 may be moved using the movement of center of gravity (e.g., barycenter offset or "BCO"). The action of moving the center of gravity of the first device 210 may produce a desired movement in the first device 210. For example, assuming that the first device 210 is in an equilibrium state, when the first driving device disposed in the first housing 211 moves along the first housing 211, the mass distribution of the first device moves, and thus the first device 210 is capable of rolling to find a new equilibrium position.

According to an embodiment, the first device 210 may include at least one wheel, which is operatively connected to the first driving device and is in contact with an inner surface (or an inner wall) (e.g., an inner sphere) of the first housing 211. Power may be transmitted from the wheel to the first housing 211 by the frictional force of between the contact surfaces of the wheel and the first housing 211. For example, when the first driving device rotates the wheel, power is transmitted from the wheel to the first housing 211 so that the first housing 211 is rotated. According to an embodiment, the first device 210 may include a control circuit (or a control device) (e.g., the processor 120 in FIG. 1), which may be included in or electrically connected to the first driving device. The control circuit may control the first driving device, and thus the rotation direction, rotation angle, rotation amount, rotation speed, the rotation acceleration, or the rotation angular velocity regarding the rotation of at least one wheel may be adjusted so as to control the movement of the device 210. In addition, the first device 210 may be implemented with various other mechanisms capable of driving the rolling motion of the first housing 211.

According to an embodiment, the first device 210 may control the first driving device, based on instructions or a program (e.g., the program 140 in FIG. 1 stored in memory (e.g., the memory 130 in FIG. 1) included in the first device 210 or the second device 220. For example, the first device 210 may control the second driving device, based on a signal (or input) received from an external electronic device (e.g., the electronic device 102 or 104 or the server 108 in FIG. 1) or data acquired from at least one sensor (e.g., an acceleration sensor, a gyro sensor, or a geomagnetic sensor) disposed in at least one of the first device 210 and the second device 220, whereby it is possible to adjust the rotation direction, rotation angle, rotation amount, rotation speed, rotation acceleration, or rotation angular velocity regarding the rotation of the at least one wheel.

According to an embodiment, the second device 220 may have a ring shape disposed on the spherical surface of the first housing 211 (or the spherical surface 211a) of the first housing 211. For example, the second device 220 may include a second housing 221 having an inner peripheral surface 221a (e.g., or a second surface), which faces the spherical surface 211a of the first housing 211 and is not exposed to the outside, and an outer peripheral surface 221b (e.g., or the third surface), which is exposed to the outside and forms a portion of the external appearance of the electronic device 200. According to an embodiment, the inner peripheral surface 221a may be disposed along a great circle 211b of the first housing 211 (e.g., a circumference formed by the intersection of a plane passing through the center C of the sphere and the spherical surface 211a). The inner peripheral surface 221a may include a surface that covers a space between a first small circle 211c of the first housing 211 spaced apart in parallel from the great circle 211b in a first direction 2001 (e.g., a circumference formed by the intersection of a plane not passing through the center C of the sphere and the spherical surface 211a) and a second small circle 211d of the first housing 211 spaced apart in parallel from the great circle 211b in a second direction 2002 opposite the first direction 2001. According to an embodiment, the second device 220 may include various electronic components (e.g., a camera 222, a display, a microphone, a speaker, or a sensor) at least partially disposed in a space (not illustrated) between the inner peripheral surface 221a and the outer peripheral surface 221b.

According to an embodiment, the second device 220 may perform a rotation motion 201 about an axis C1 passing through the center of the great circle 211b along which the inner circumferential surface 221a is disposed. According to an embodiment, the second protrusion 220 may perform a tilting motion 202. When the second device 220 performs the tilting motion 202, the area of the spherical surface 211a, which faces the inner circumferential surface 221a, varies, and thus the great circle 211b, the first circle 211c, the second circle 211d, and the axis C1 may also vary. According to some embodiments, the tilting motion 202 may be referred to as a rotation motion performed about an axis (not illustrated) orthogonal to the axis C1 of the rotation motion 201.

According to an embodiment, the electronic device 200 may include at least one rolling element or sliding member for reducing friction between the second device 220 and the first housing 211. The rolling element or sliding member may reduce energy loss caused due to friction (e.g., kinetic friction) that occurs when the second device 220 moves on the first housing 211. For example, the rolling element may mean any of various elements that enable a rolling motion between the first device 210 and the second device 220. For example, the sliding member may mean any of various elements that enable a sliding motion between the first device 210 and the second device 220. According to an embodiment, a plurality of rolling elements or sliding members may be disposed on at least a portion of the inner peripheral surface 221a of the second housing 221, and the inner peripheral surface 221a of the second housing 221 and the spherical surface 211a of the first housing 211 may be arranged with a gap therebetween due to the plurality of rolling elements or sliding members.

According to an embodiment, the driving device of the first device 210 may include a second driving device (not illustrated) configured to cause the motion of the second device (e.g., a rotation motion 201 or a tilting motion 202). According to an embodiment, between the second driving device and the second device 220, force for pulling each other (attractive force) may act with the first housing 211 interposed therebetween. For example, the second device 220 may include a plurality of second magnets disposed on the inner peripheral surface 221a, and the second driving device may include a plurality of first magnets aligned with the plurality of second magnets. For example, the second driving device of the first device 210 may include a structure (e.g., a ring structure) accommodated in the first housing 211, and the structure may include an annular ring plate disposed to face the inner peripheral surface 221a of the second device 220. The plurality of first magnets may be disposed on the ring plate so as to face the plurality of second magnets. When the second driving device performs the rotation motion or the tilting motion, the second device 220 may also perform the rotation motion 201 or the tilting motion 202 due to the attractive force between the plurality of first magnets and the plurality of second magnets.

According to certain embodiments, the second device 220 may be formed in various other shapes that are movable on the first housing 211 without being limited to the illustrated shape.

According to an embodiment, the first device 210 may control the second driving device, based on instructions or a program (e.g., the program 140 in FIG. 1) stored in memory (e.g., the memory 130 in FIG. 1) included in the first device 210 or the second device 220. For example, the first device 210 may control the first driving device, based on a signal (or input) received from an external electronic device (e.g., the electronic device 102 or 104 or the server 108 in FIG. 1) or data acquired from at least one sensor (e.g., an acceleration sensor, a gyro sensor, or a geomagnetic sensor) disposed in at least one of the first device 210 and the second device 220, whereby it is possible to determine the rotation direction, rotation angle, rotation amount, rotation speed, rotation acceleration, or rotation angular velocity regarding the rotation motion 201 or the tilting motion 202 of the second device 220.

According to an embodiment, the first device 210 may receive a signal from the second device 220 or transmit a signal to the second device 220 through wireless communication. For example, the first device 210 may communicate with the second device 220 via a short range communication network (e.g., the first network 198 in FIG. 1), such as Bluetooth, Wi-Fi direct, or infrared data association (IrDA). According to certain embodiments, the electronic device 200 (e.g., the first device 210 or the second device 220) may wirelessly communicate with an external control unit (e.g., a data logging or navigation system).

According to certain embodiments, the electronic device 200 may be implemented as an autonomous robot or a remotely controlled (tele operated) robot.

Figure 3:
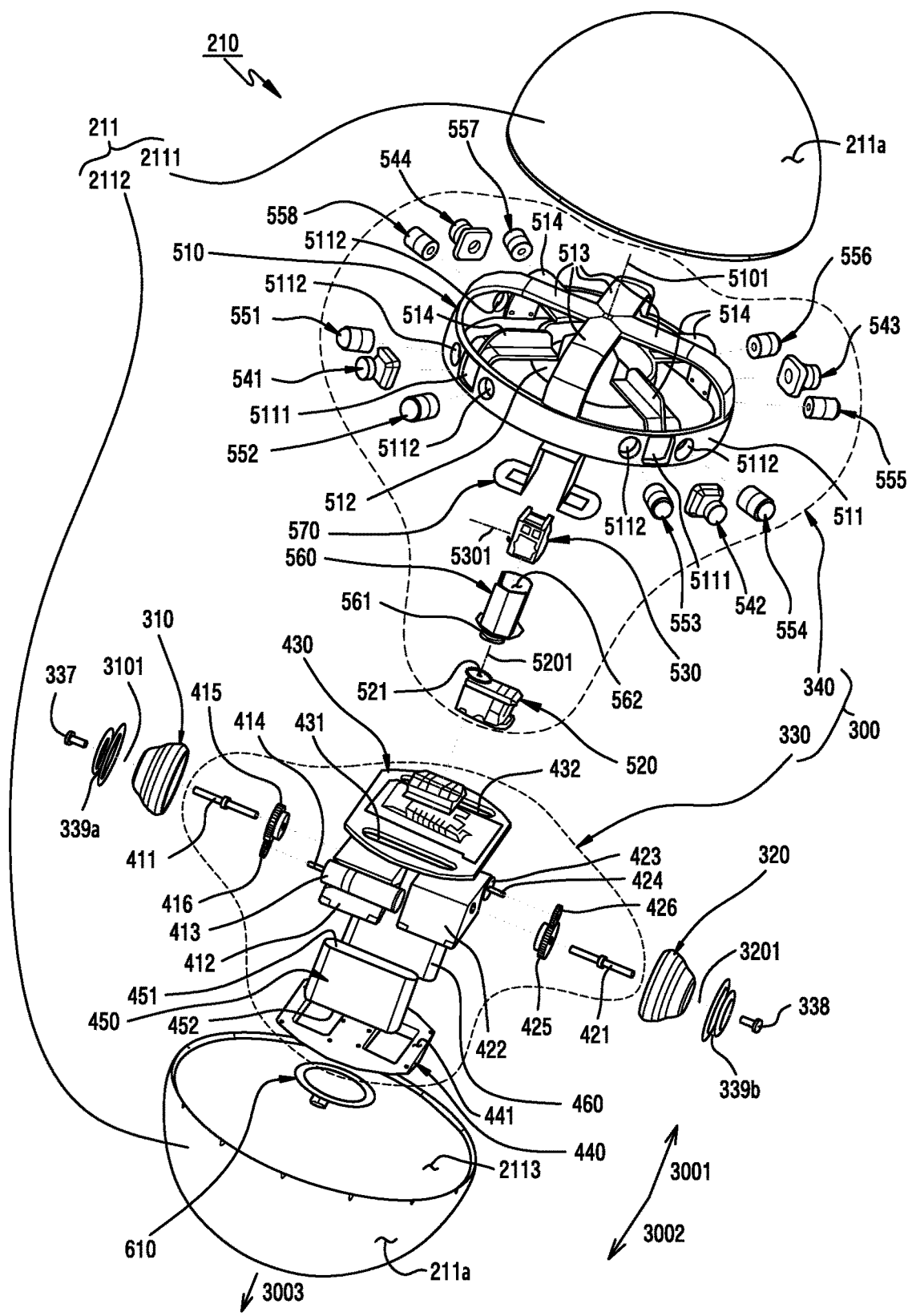
FIG. 3 is an exploded perspective view illustrating a first device in FIG. 2A.
Figure 4A:
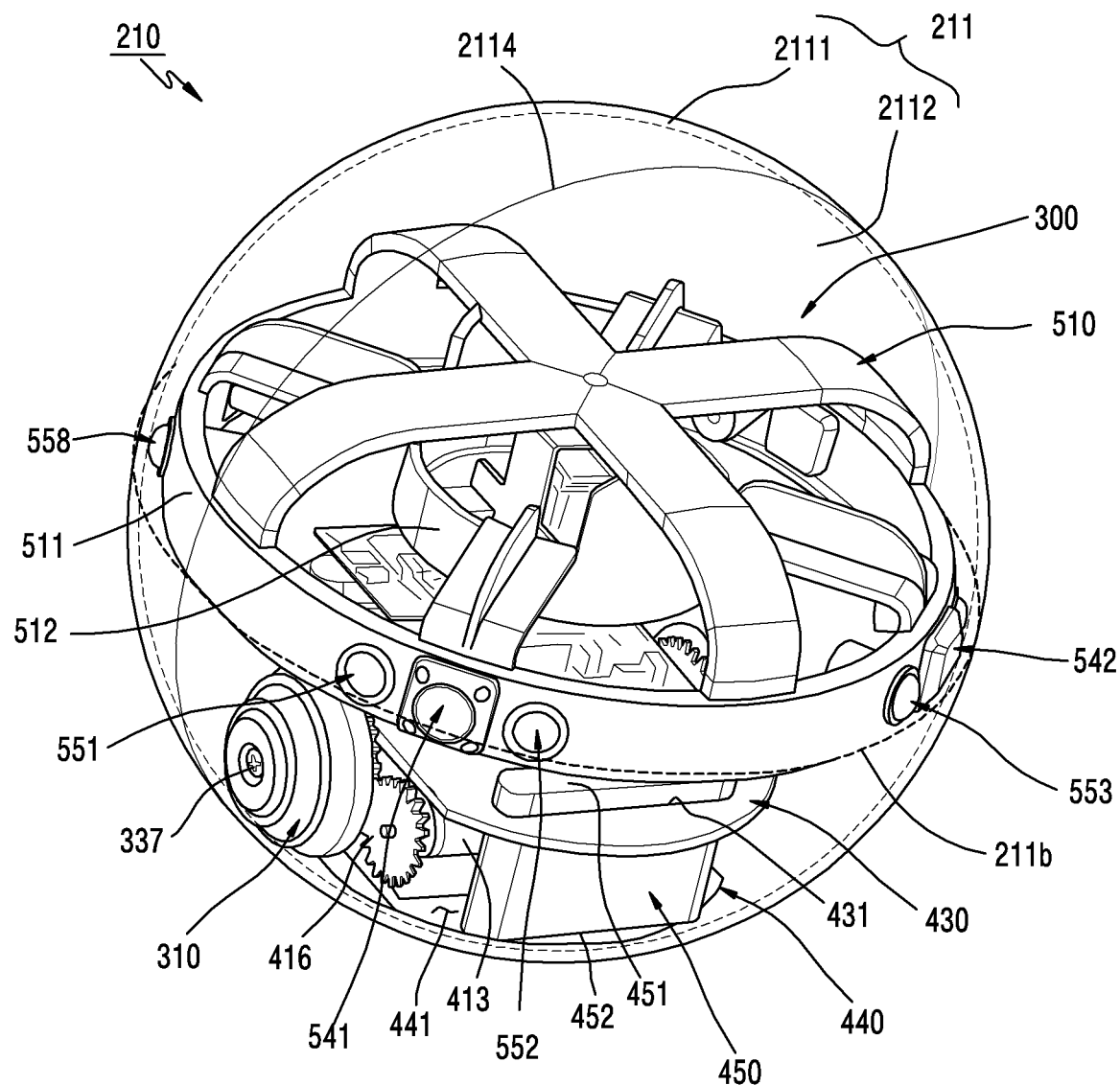
FIG. 4A is a perspective view of a first device according to an embodiment and FIG. 4B is a perspective view of a first device according to an embodiment.
Figure 4B:
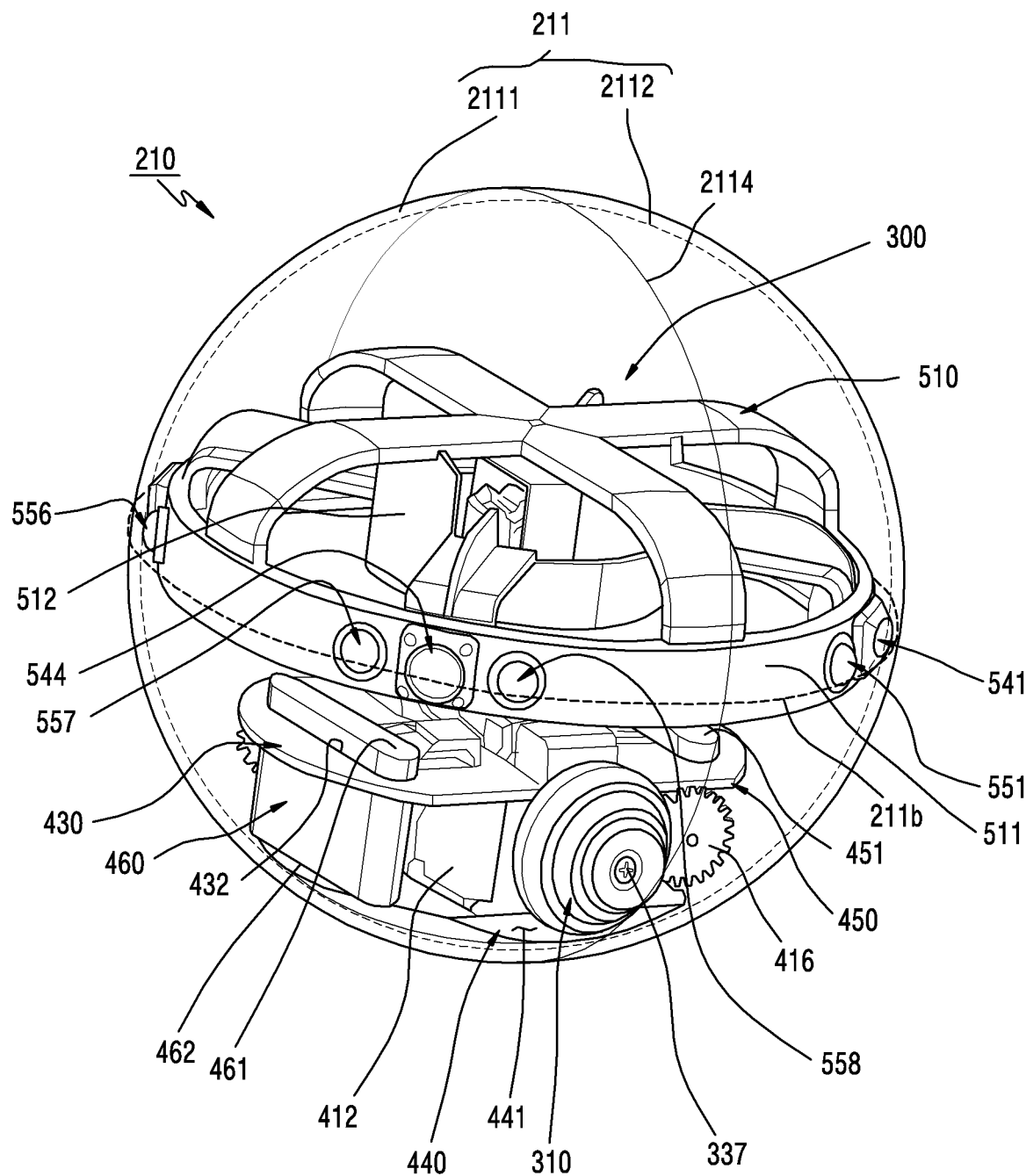

FIG. 3 is an exploded perspective view illustrating a first device in FIG. 2A. FIG. 4A is a perspective view of a first device according to an embodiment and FIG. 4B is a perspective view of a first device according to an embodiment;

Referring to FIGS. 3, 4A, and 4B, in an embodiment, the first device 210 may include at least one of a first housing 211, a first wheel 310, a second wheel 320, and a driving device 300.

According to an embodiment, the first housing 211 may include a first hemispheric housing 2111 and a second hemispheric housing 2112. The first wheel 310, the second wheel 320, and the driving device 300 may be disposed in a spherical inner space formed by coupling the first hemispherical housing 2111, and the second hemispherical housing 2112. In FIGS. 4A and 4B, the first housing 211 is depicted as transparent for the purpose of allowing structural understanding of elements disposed inside the first housing 211, but according to certain embodiments, the first housing 211 may be formed of an opaque material, as well as a transparent material. According to certain embodiments, the first housing 211 may be formed of a solid material or a flexible material.

According to certain embodiments, the first housing 211 may fully seal the first device 210 from the external environment. For example, a sealing material may be interposed in the joint portion 2114 between the first hemispherical housing 2111 and the second hemispherical housing 2112. According to some embodiments, the first housing 211 may include at least one through hole. For example, heat generated in the first housing 211 may be released to the outside through the at least one through hole. According to certain embodiments, a porous member such as a mesh may be disposed in the at least one through hole in order to prevent the ingress of foreign matter (e.g., dust).

According to an embodiment, the driving device 300 may include a first driving device 330 for transmitting power to the first wheel 310 and the second wheel 320. The first wheel 310 and the second wheel 320 may be coupled to opposite sides of the first driving device 330 to rotate upon receiving power from the first driving device 330. According to some embodiments, the first driving device 330 may be referred to as an element including a wheel (e.g., the first wheel 310 or the second wheel 320).

According to an embodiment, the first driving device 330 may include elements for transmitting power to the first wheel 310. For example, the first driving device 330 may include at least one of a first shaft 411, a first support member 412, a first motor 413, a first gear 415, or the second gear 416. The first shaft 411 may include a first wheel 310 and a first support member 412. One end portion of the first shaft 411 may be coupled to the first wheel 310 by a bolt 337, and the other end portion of the first shaft 331 may be rotatably coupled to a hole (not illustrated) formed in the first support member 412. The first gear 415 may be connected to the first shaft 411 between the first wheel 310 and the first support member 412. The first gear 415 may be provided on the first support member 412, and the shaft 414 of the first motor 413 may be connected to the second gear 416. The first gear 415 and the second gear 416 may transmit rotation or power between the first shaft 411 and the shaft 414 of the first motor 413. For example, the first gear 415 and the second gear 416 may be spur gears or helical gears. When the first motor 413 is driven, the first wheel 310 may be rotated by interaction between the second gear 416 connected to the shaft 414 of the first motor 413 and the first gear 415 connected to the first shaft 411. According to an embodiment, the first gear 415 may have more teeth than the second gear 416, and the gear ratio between the first gear 415 and the second gear 416 may vary. According to certain embodiments, the gears for transmitting power between the first wheel 310 and the first motor 413 may be replaced with various other gears (e.g., bevel gears and skew gears) and the arrangement of the first shaft 411 and/or the first motor 413 may vary thereby. According to some embodiments, the shaft 414 of the first motor 413 and the first wheel 310 may be directly connected without the first gear 415 and the second gear 416.

According to an embodiment, the first driving device 330 may include elements for transmitting power to the second wheel 320, and the elements may be provided in substantially the same manner as that of providing the elements for transmitting power to the first wheel 310. For example, in connection with the second wheel 320, the first driving device 330 may include at least of a second shaft 421, a second support member 422, a second motor 423, a third gear 425, or a fourth gear 426. One end portion of the second shaft 421 may be coupled to the second wheel 320 by a bolt 338, and the other end portion of the second shaft 421 may be rotatably coupled to a hole (not illustrated) formed in the second support member 422. The third gear 425 may be connected to the second shaft 421 between the second wheel 320 and the second support member 422. The second gear 416 may be provided on the second support member 422, and the shaft 424 of the second motor 423 may be connected to the fourth gear 426. The third gear 425 and the fourth gear 426 may transmit power between the second motor 423 and the second wheel 320. According to an embodiment, the axis of rotation 3201 of the second wheel 320 and the axis of rotation 3101 of the first wheel 310 may coincide.

According to certain embodiments, the first support member 412 and the second support member 422 may be integrally formed, and may include the same material.

According to certain embodiments, the first wheel 310 and the second wheel 320 may include elastic members (or flexible members) 339a and 339b, such as rubber disposed on the surfaces thereof. The elastic members 339a and 339b may increase the frictional force between the inner surface 2113 of the first housing 211 and the first wheel 310 and the second wheel 320, and may reduce the loss of power transmitted from the first wheel 310 and the second wheel 320 to the first housing 211. According to certain embodiments, the elastic members 339a and 339b may absorb impacts between the first housing 211 and the first driving device 330, whereby the force of an impact transmitted to the first driving device 330 from the outside may be reduced. According to certain embodiments, the elastic members 339a and 339b may reduce vibration. For example, the elastic members 339a and 339b may prevent vibration, generated when driving devices (e.g., the first driving device 330 and the second driving device 340) are driven, from being transferred to the first housing 211.

According to an embodiment, the first driving device 330 may include a printed circuit board 430 and a first plate 440 disposed parallel to each other in a first direction 3001 orthogonal to the axis of rotation 3101 of the first wheel 310 (or the axis of rotation 3201 of the second wheel 320). According to certain embodiments, a plate for supporting the printed circuit board 430 may be further provided.

According to an embodiment, the first support member 412 and the second support member 422 may be disposed between the printed circuit board 430 and the first plate 440. According to an embodiment (not illustrated), the first support member 412 and the second support member 422 may be coupled to the printed circuit board 430 and/or the first plate 440 using elements such as bolts.

According to an embodiment, the first driving device 330 may include a second plate 450 and a third plate 460 disposed parallel to each other in a second direction 3002 orthogonal to the axis of rotation 3101 of the first wheel 310 (or the axis of rotation 3201 of the second wheel 320) and the first direction 3001. The first support member 412 and the second support member 422 may be disposed between the second plate 450 and the third plate 460. One end portion 451 of the second plate 450 may be coupled to the printed circuit board 430, and the other end portion 452 of the second plate 450 may be coupled to the first plate 440. One end portion 461 of the third plate 460 may be coupled to the printed circuit board 430, and the other end portion 462 of the third plate 460 may be coupled to the first plate 440.

According to an embodiment, the printed circuit board 430 may include a first pass-through portion 431 and a second pass-through portion 432, and one end portion 451 of the second plate 450 may be inserted into the first pass-through portion 431 and one end portion 461 of the third plate 460 may be inserted into the second pass-through portion 432. According to an embodiment, the first plate 440 may include one surface 441 oriented in a first direction 3001, and the other end portion 452 of the second plate 450 and/or the other end portion 462 of the third plate 460 may be coupled to face the surface 441 using an element such as a bolt.

According to some embodiments, the first plate 440 and the second plate 450 (or the third plate 460) may be integrally formed, and may include the same material.

According to an embodiment, at least some of the first plate 440, the second plate 450, the third plate 460, the first support member 412, or the second support member 422 may be formed of a metallic material or a non-metallic material.

According to an embodiment, a processor (e.g., the processor 120), memory, and/or an interface may be mounted on the printed circuit board 430. The processor may include at least one of, for example, a central processing unit, an application processor, a graphic processor, an image signal processor, a sensor hub processor, or a communication processor.

The memory (e.g., the memory 130 in FIG. 1) may include, for example, volatile memory (e.g., the volatile memory 132 in FIG. 1) or nonvolatile memory (e.g., the nonvolatile memory 134 in FIG. 1).

The interface (e.g., the interface 177 in FIG. 1) may include, for example, a high definition multimedia interface (HDMI), a universal serial bus (USB) interface, an SD card interface, and/or an audio interface. The interface may electrically or physically connect, for example, the electronic device, to an external electronic device, and may include a USB connector, an SD card/an MMC connector, or an audio connector. For example, the first housing 211 may provide a hole for the interface.

According to an embodiment, at least one motor driving circuit (e.g., a motor driver or a motor controller) (not illustrated) may be disposed on the printed circuit board 430. At least one motor driving circuit is electrically connected to the first motor 413 and the second motor 423, and may output a corresponding signal to the first motor 413 or the second motor 423 under the control of the processor (e.g., the processor 120 in FIG. 1). According to an embodiment, the processor may control the first motor 413 or the second motor 423, based on instructions or a program (e.g., the program 140 in FIG. 1) stored in memory (e.g., the memory 130 in FIG. 1) included in the first device 210 or the second device 220 (e.g., the second device 220 in FIG. 2A). For example, the processor may control the first motor 413 or the second motor 423, based on a signal (or input) received from an external electronic device (e.g., the electronic device 102 or 104 or the server 108 in FIG. 1) or data acquired from at least one sensor (e.g., an acceleration sensor, a gyro sensor, or a geomagnetic sensor) disposed in at least one of the first device 210 and the second device 220 (e.g., the second device 220 in FIG. 2A), whereby it is possible to adjust the rotation direction, rotation angle, rotation amount, rotation speed, rotation acceleration, or rotation angular velocity regarding the rotation of the first wheel 310 or the second wheel 320.

According to an embodiment, the first driving device 330 may include a battery (not illustrated) as a device for supplying power to at least one component of the first device 210. The battery may include, for example, a rechargeable secondary cell or a fuel cell. According to an embodiment, the battery may be disposed between the printed circuit board 430 and the first plate 440. According to certain embodiments, the battery may be disposed at any of various other positions. According to certain embodiments, the battery may be implemented using solar cells.

According to an embodiment, the driving device 300 may include a second driving device 340 connected to the first driving device 330. The second driving device 340 may include at least one of, for example, a ring structure 510, a third motor 520, a fourth motor 530, a first support structure 560, a second support structure 570, a plurality of first magnets 541, 542, 543, and 544, or a plurality of second rolling elements 551, 552, 553, 554, 555, 556, 557, and 558.

According to an embodiment, the ring structure 510 has a bracket 512, an annular plate (hereafter, a "ring plate") 511 surrounding the bracket 512, and a plurality of ribs 513 and 514 between the bracket 512 and the ring plate 511. The bracket 512 may be a shaft to which power is transmitted. The ring plate 511 may be disposed so as to face the inner surface 2113 of the first housing 211, and may be connected to the bracket 512 and the plurality of ribs 513 and 514 to as to perform a rotation motion or a tilting motion depending on the motion of the bracket 512. For example, the ring structure 510 may be rotated about a third axis of rotation 5101 passing through the bracket 512. The center of gravity of the ring structure 510 may be disposed on the third axis of rotation 5101. The plurality of ribs 513 and 514 may include first ribs 513 and second ribs 514 arranged at substantially the same angle about the bracket 512. When viewed in the first direction 3001, each of the second ribs 514 may be disposed between every two adjacent first ribs 513. According to an embodiment, the bracket 512 takes a form having an opening, and may include a first edge (not illustrated) and a second edge (not illustrated) formed at different heights in the first direction 3001. The first ribs 513 may extend from the ring plate 511 and converge to the third axis of rotation 5101, and the first edge of the bracket 512 may further extend in the first direction 3001 than the second edge and may be connected to the first ribs 513. The second ribs 514 may extend from the ring plate 511 to the second edge of the bracket 512.

According to an embodiment, the ring plate 511 may be disposed along the great circle 211b of the first housing 211 (e.g., a circumference formed by the intersection of a plane passing through the center of the sphere and the spherical surface 211a).

According to an embodiment, the third motor 520 may be disposed between the bracket 512 of the ring structure 510 and a printed circuit board 430. For example, the third motor 520 may be mounted on the printed circuit board 430.

According to certain embodiments (not illustrated), various structures for coupling the third motor 520 and the printed circuit board 430 may be provided.

According to an embodiment, the fourth motor 530 may be disposed between the bracket 512 of the ring structure 510 and the third motor 520. According to an embodiment, the first support structure 560 may be disposed between the third motor 520 and the fourth motor 530 so as to connect the third motor 520 and the fourth motor 530. For example, the first support structure 560 may include a space 562 in which one end 561 of the first support structure 560 to be connected to the shaft 521 of the third motor 520 (or a gear connected to the shaft) and the fourth motor 530 are fitted to each other. When the third motor 520 (e.g., a pan motor) is driven, the first support structure 560 connected to the shaft 521 and the fourth motor 530 disposed on the first support structure 560 may perform a rotation motion about a first axis of rotation 5201 oriented in a first direction 3001.

According to an embodiment, the second support structure 570 may connect the bracket 512 of the ring structure 510 and the fourth motor 530. When the third motor 520 is driven, the first support structure 560 connected to the shaft 521 of the third motor 520, the fourth motor 530 coupled with the first support structure 560, the second support structure 570 connected to the fourth motor 530, and the ring structure 510 connected to the second support structure 570 may perform a rotation motion about the first axis of rotation 5201. When the fourth motor 530 (e.g., a tilt motor) is driven, the second support structure 570 connected to the shaft (not illustrated) of the fourth motor 530 and the ring structure 510 connected to the second support structure 570 may perform a rotation motion (e.g., a tilting motion) about a second axis of rotation 5301 oriented in a direction orthogonal to the first direction 3001.

According to an embodiment, when the first axis of rotation 5201 and the third axis of rotation 5301 coincide, the ring structure 510 may be described as being in a horizontal state with respect to the first driving device. When the third motor 520 is driven when the first axis of rotation 5201 and the third axis of rotation 5301 coincide, the ring structure 510 may perform a rotation motion about the first axis of rotation 5201 or the third axis of rotation 5301 in a horizontal state. When the third motor 520 is driven when the first axis of rotation 5201 and the third axis of rotation 5301 do not coincide due to the driving of the fourth motor 530, the ring structure 510 may perform a rotation motion about the first axis of rotation 5201 in a non-horizontal state.

According to an embodiment, at least one motor driving circuit (e.g., a motor driver or a motor controller) disposed on the printed circuit board 430 may be electrically connected to the third motor 520 and the fourth motor 530. At least one motor driving circuit may output corresponding signals to the third motor 520 and the fourth motor 530 under the control of the processor (e.g., the processor 120 in FIG. 1). According to an embodiment, the processor may control the third motor 520 or the fourth motor 530, based on instructions or a program (e.g., the program 140 in FIG. 1) stored in memory (e.g., the memory 130 in FIG. 1) included in the first device 210 or the second device 220 (e.g., the second device 220 in FIG. 2A). For example, the processor may control the third motor 520 or the fourth motor 530 of the second driving device 340, based on a signal (or input) received from an external electronic device (e.g., the electronic device 102 or 104 or the server 108 in FIG. 1, or the second device 220 in FIG. 2A), or data acquired from at least one sensor (e.g., an acceleration sensor, a gyro sensor, or a geomagnetic sensor) (e.g., a 9-axis sensor) disposed in at least one of the first device 210 and the second device (e.g., the second device 220 in FIG. 2A).

According to an embodiment, the plurality of second rolling elements 551, 552, 553, 554, 555, 556, 557, and 558 may be disposed on the ring plate 511 of the ring structure 510. For example, the plurality of second rolling elements 551, 552, 553, 554, 555, 556, 557, and 558 may be respectively disposed in a plurality of through holes 5112 (recesses) formed in the ring plate 511. According to an embodiment, the inner surface 2113 of the first housing 211 and the ring plate 511 of the ring structure 510 may be arranged with a gap therebetween due to the plurality of second rolling elements 551, 552, 553, 554, 555, 556, 557, and 558. According to an embodiment, the plurality of second rolling elements 551, 552, 553, 554, 555, 556, 557, and 558 may include a plurality of pairs, in each of which rolling elements are disposed to face each other.

According to an embodiment, the plurality of second rolling elements 551, 552, 553, 554, 555, 556, 557, and 558 may support the first housing 211, which rotates relative to the driving device 300 while maintaining a gap between the inner surface 2113 of the housing 211 and the ring plate 511 of the ring structure 510. For example, the plurality of second rolling elements 551, 552, 553, 554, 555, 556, 557, and 558 may reduce the frictional force between the inner surface 2113 of the first housing 211 and the ring plate 511 of the ring structure 510. The plurality of second rolling elements 551, 552, 553, 554, 555, 556, 557, and 558 may reduce loss of energy caused by friction occurring when the ring plate 511 moves relative to the inner surface 2113 of the first housing 211 or when the first housing 211 rotates relative to the driving device 300.

The second rolling element may mean any of various elements that enable a rolling motion, for example, between the inner surface 2113 of the first housing 211 and the ring plate 511 of the ring structure 510. According to an embodiment, the plurality of second rolling elements 551, 552, 553, 554, 555, 556, 557, and 558 may correspond to a ball caster. The ball caster may include, for example, a ball that is rollable on the inner surface 2113 of the first housing 211. According to certain embodiments, the ball caster may include a structure for elastically pressing the ball against the inner surface 2113 of the first housing 211. According to certain embodiments, various other rolling elements may be utilized in place of the ball caster. According to some embodiments, a sliding member may be used in place of the rolling elements. The sliding member may mean any of various elements that enable a rolling motion between the inner surface 2113 of the first housing 211 and the ring plate 511 of the ring structure 510.

According to an embodiment, a plurality of first magnets 541, 542, 543, and 544 may be disposed on the ring plate 511 of the ring structure 510. For example, a plurality of first magnets 541, 542, 543, and 544 may be disposed respectively in the recesses 5111 (or through holes) formed in the ring plate 511. The plurality of first magnets 541, 542, 543, and 544 may provide force (attractive force) that attracts the second device (e.g., the second device 220 in FIG. 2A) coupled with the first device 210. For example, the second device may include a plurality of second magnets aligned with the plurality of first magnets 541, 542, 543, and 544, whereby attractive force is capable of acting between the ring plate 511 and the second device with the first housing 211 interposed therebetween. When the second driving device 340 performs a rotation motion by the third motor 520 or performs a tilting motion by the fourth motor 530, the second device is also capable of performing a rotation motion (e.g., the rotation motion 201 in FIG. 2A) or a tilting motion (e.g., the tilting motion 202 in FIG. 2A) due to the attractive force between the plurality of first magnets 541, 542, 543, 544 and the plurality of second magnets.

According to an embodiment, the plurality of first magnets 541, 542, 543, and 544 may be arranged on the ring plate 511 at regular intervals of the ring structure 510 along the circumference thereof. According to an embodiment, the plurality of second rolling elements 551, 552, 553, 554, 555, 556, 557, and 558 may include a plurality of pairs, in each of which rolling elements are disposed to face each other with each of first magnet interposed therebetween.

According to an embodiment, the first device 210 may include at least one antenna. The at least one antenna may transmit or receive a signal or power to or from the outside (e.g., the electronic device 102 or 104 in FIG. 1). According to an embodiment, the first device 210 may transmit or receive a signal or power to or from a second device (e.g., the second device 220 in FIG. 2A) coupled therewith via at least one antenna. According to an embodiment, the at least one antenna may be formed of a conductor or a conductive pattern. According to an embodiment, the at least one antenna may be utilized in a short range wireless communication network (e.g., the first network 198 in FIG. 1) or a long range wireless communication network (e.g., the second network 199 in FIG. 1).

According to an embodiment, the first device 210 may include a balance weight. The balance weight may bias the center of gravity of the first device 210 in the third direction 3003 opposite the first direction 3001. For example, the center of gravity of the first device 210 may be disposed at a position spaced apart from the axis of rotation 3101 or 3201 of the wheels in the third direction 3003. According to an embodiment, the balance weight may balance the first device 210 such that the rear surface (or a first surface) of the first plate 440 (e.g., the surface facing the inner surface 2113 of the first housing 211) is oriented substantially in the third direction 3003. According to an embodiment, the balance weight may be formed by at least some of the first support member 412, the second support member 422, the first plate 440, the second plate 450, the third plate 460, and the battery included in the first driving device 330. According to certain embodiments, the second driving device 340 may be formed to have a weight less than or equal to a set weight compared to the first driving device 330, and thus the center of gravity of the first device 210 may be biased in the third direction 3003. According to certain embodiments, the second driving device 340 may be formed to have a height less than or equal to a set height, and thus the center of gravity of the first device 210 may be biased in the third direction 3003. According to certain embodiments, even when the first device 210 and the second device (e.g., the second device 220 in FIG. 2A) are coupled to each other, the balance weight may balance the first device 210 such that the rear surface of the first plate 440 is oriented substantially in the third direction 3003.

According to an embodiment, the balance weight may resolve imbalance in the first driving device 330, which may be caused when the first driving device 330 transmits power to the first wheel 310 and/or the second wheel 320. For example, there may be an action in which a wheel (e.g., the first wheel 310 or the second wheel 320) comes into contact with the first housing 211 and rotates and a reaction in which the driving device 300 is affected by a torque that rotates power transmission elements connected to the wheels (e.g., the first shaft 411, the second shaft 421, the first gear 415, the second gear 416, the third gear 425, and the fourth gear 426) (e.g., shaking of the rotation axis). The balance weight may cancel the torque applied to the driving device 300 by the reaction.

According to an embodiment, the balance weight may resolve imbalance in the first driving device 330, which may be caused when the second driving device 340 performs a rotation motion or a tilting motion.

According to an embodiment, the first device 210 may include an antenna 610 disposed on the rear surface (e.g., the face oriented in the third direction 3003) of the first plate 440 of the first driving device 330) and (e.g., a surface facing in the third direction 3003), or between the rear surface of the first plate 440 and the first housing 211. According to some embodiments, the antenna 610 may be disposed inside the first plate 440. The antenna 610 may be, for example, a wireless charging antenna, and may wirelessly transmit/receive power utilized for charging. According to an embodiment, the first driving device 330 may be balanced by the balance weight in the first housing 211, and the surface on which the antenna 610 is disposed may be oriented in the third direction 3003.

According to an embodiment, the first device 210 may be configured to move to a wireless charging device, based on instructions or a program (e.g., the program 140 in FIG. 1) stored in memory (e.g., the memory 130 in FIG. 1) when the remaining amount of the battery reaches a set value. When the first device 210 moves to the wireless charging device, the antenna 610 may be aligned with an antenna included in the wireless charging device 400, and power may be wirelessly transmitted from the wireless charging device to the first device 210 by electromagnetic induction between the two antennas. The first device 210 may include an electromagnetic-induction-type power transmission and reception circuit and may comply with, for example, a wireless power consortium (WPC) standard. The electromagnetic-induction-type power transmission/reception circuit according to the WPC standard is capable of wirelessly receiving or transmitting power from or to an external device using a frequency ranging from 110 kHz to 205 kHz. According to some embodiments, the electromagnetic-induction-type power transmission/reception circuit may comply with a power matter alliance (PMA) standard. The electromagnetic-induction-type power transmission/reception circuit according to the PMA standard is capable of wirelessly receiving or transmitting power from or to an external device using a frequency ranging from 227 kHz to 357 kHz or a frequency ranging from 118 kHz to 153 kHz.

According to another embodiment, the first device 210 may include an electromagnetic-resonance-type power transmission/reception circuit. For example, at least a portion of the at least one antenna and a power transmission antenna (e.g., a coil) of an external device may have the same resonance frequency, and the power transmission/reception circuit of the first device 210 may receive power or transmit from or to the external device using a resonance phenomenon therebetween. The electromagnetic-resonance-type power transmission/reception circuit may comply with the alliance for wireless power (A4WP) standard. The electromagnetic-resonance-type power transmission/reception circuit according to the A4WP standard is capable of wirelessly receiving or transmitting power from or to an external device using a resonance frequency of 6.78 MHz.

According to certain embodiments, the first device 210 may include a connection terminal (e.g., the connection terminal 178 in FIG. 1) such as a connector capable of being physically connected to an external electronic device (e.g., the electronic device 102). According to an embodiment, the connection terminal may include, for example, an HDMI connector, a USB connector, an SD card connector, or an audio connector. According to certain embodiments, a power management module (e.g., the power management module 188 in FIG. 1) disposed in the first device 210 may charge a battery (e.g., the battery 189 in FIG. 1) disposed in the first device 210 using external power transmitted through the connection terminal.

According to an embodiment, the rear surface (e.g., the surface oriented in the third direction 3003) of the first plate 440 may include a curved surface, which is complementary to the inner surface 2113 of the first housing 211. According to an embodiment, when the first driving device 330 is balanced by the balance weight, the rear surface of the first plate 440 may be spaced apart from the inner surface 2113 of the first housing 211 due to the first wheel 310 and the second wheel 320, which are in contact with the inner surface 2113 of the first housing 211.

According to an embodiment, the first device 210 may include at least one rolling element (not illustrated) disposed on the rear surface (e.g., the surface oriented in the third direction 3003) of the first plate 440. The at least one first rolling element may mean any of various elements that enable a rolling motion between the rear surface of the first housing 211 and the inner surface 2113 of the first housing 211. According to an embodiment, the at least one rolling element may support the first housing 211, which rotates relative to the driving device 300, while maintaining a gap between the rear surface of the first plate 440 and the inner surface 2113 of the housing 211. For example, assuming that there is no first rolling element, when the first device 210 moves or the ring structure 510 moves, the driving device 300 may be tilted about the axis of rotation 3101 or 3201 of a wheel due to the moment of inertia or reaction. As a result, the rear surface of the first plate 440 may come into contact with the inner surface 2113 of the first housing 211. When the rear surface of the first plate 440 comes into contact with the inner surface 2113 of the first housing 211, the frictional force generated therefrom may deteriorate the driving efficiency of the first driving device 330 or may make the movement of the first device 210 unstable.

According to an embodiment, the at least one first rolling element may include a ball caster. The ball caster may include, for example, a ball that is rollable on the inner surface 2113 of the first housing 211. According to certain embodiments, the ball caster may include a structure for elastically pressing the ball against the inner surface 2113 of the first housing 211. According to certain embodiments, various other rolling elements may be utilized in place of the ball caster. According to some embodiments, a sliding member may be used in place of the rolling elements. The sliding member may mean any of various elements that enable a rolling motion between the inner surface 2113 of the first housing 211 and rear surface of the first plate 440.

According to an embodiment, the first device 210 may be implemented by omitting the second driving device 340 related to the second device (e.g., the second device 220 in FIG. 2A).

Figure 5:
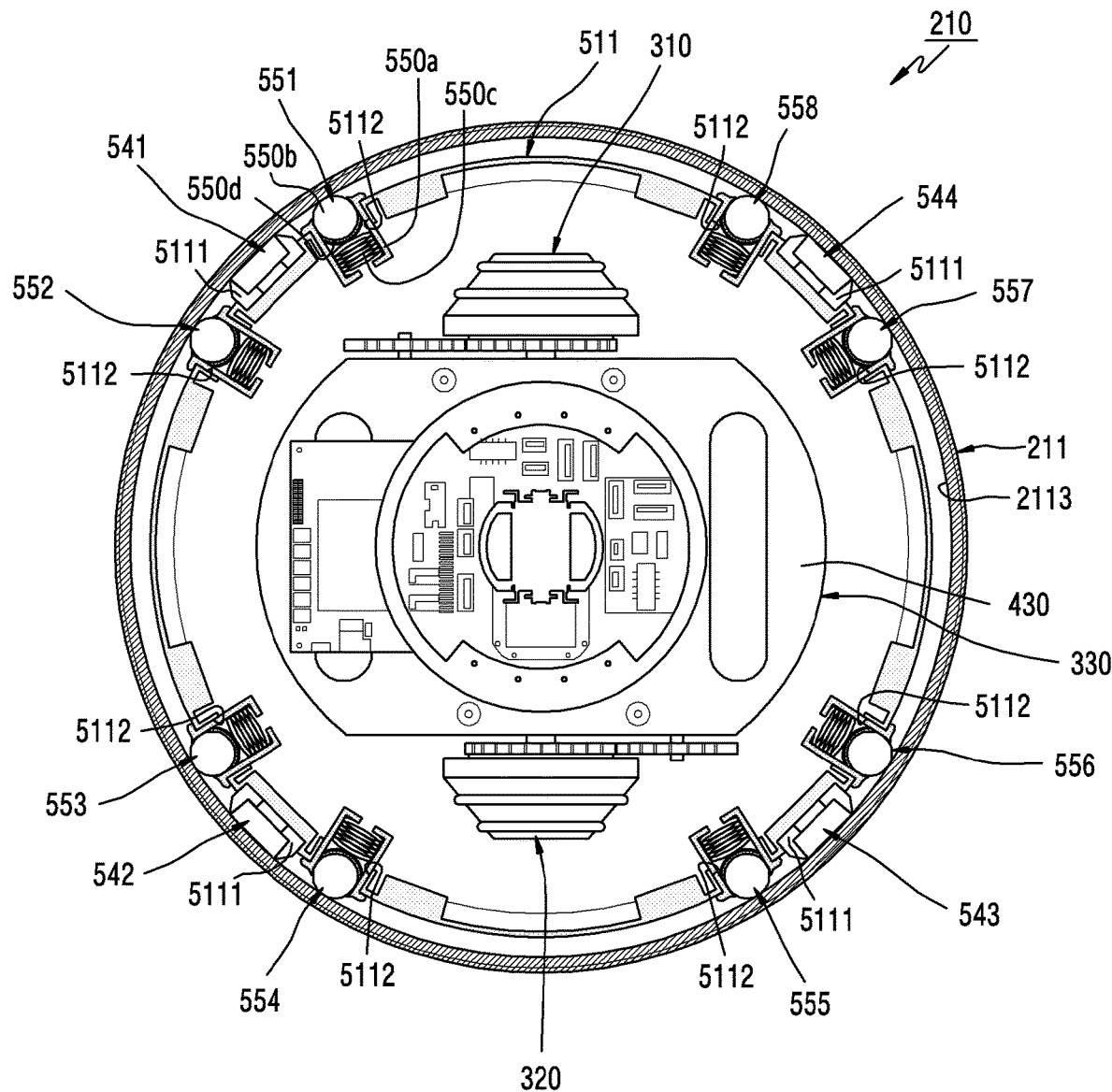
FIG. 5 is a partial cross-sectional view of a first device according to an embodiment.

FIG. 5 is a partial cross-sectional view of a first device according to an embodiment.

Referring to FIG. 5, the first device 210 may include at least one of a first housing 211, a first wheel 310, a second wheel 320, a first driving device 330, a ring plate 511, a plurality of first magnets 541, 542, 543, and 544, or a plurality of second rolling elements 551, 552, 553, 554, 555, 556, 557, and 558. Since the first driving device 330 including the first housing 211, the first wheel 310, the second wheel 320, or the printed circuit board 430 is substantially the same as that in FIG. 3, a detailed description thereof will be omitted.

According to an embodiment, the ring plate 511 may include a plurality of recesses 5111 arranged at regular intervals along the circumference thereof so as to face the inner surface 2113 of the first housing 211. For example, the plurality of first magnets 541, 542, 543, and 544 may be disposed respectively in the recesses 5111 in the ring plate 511. The plurality of first magnets 541, 542, 543, and 544 may face the inner surface 2113 of the first housing 211 and may be substantially physically separated from the inner surface 2113.

According to an embodiment, the ring plate 511 may include a plurality of through holes 5112. For example, the plurality of second rolling elements 551, 552, 553, 554, 555, 556, 557, and 558 may be respectively inserted in the plurality of through holes 5112 in the ring plate 511. The inner surface 2113 of the first housing 211 and the ring plate 511 may be arranged with a gap therebetween due to the plurality of second rolling elements 551, 552, 553, 554, 555, 556, 557, and 558. According to an embodiment, the plurality of second rolling elements 551, 552, 553, 554, 555, 556, 557, and 558 may include a plurality of pairs, in each of which rolling elements are disposed to face each other with each of first magnet interposed therebetween.

According to an embodiment, the second rolling elements 554, 555, 556, 557, and 558 may correspond to a ball caster. In an embodiment, when viewed in cross section, the ball caster may include at least one of a cage (or a housing) 550a, a ball 550b, an elastic member 550c, or a roller 550d. The cage 550a has a structure in which an opening formed at one side thereof, and may provide an inner space in which the ball 550b, the elastic member 550c, and the roller 550d are disposed. A portion of the ball 550b may be exposed to the outside through the opening in the cage 550a, and the opening may include a structure that prevents the ball 550b from breaking away to the outside. The elastic member 550c may be supported on the inner surface of the cage 550a to elastically press the ball 550b towards the opening, and may include various members, for example, a compression spring. According to an embodiment, the ball 550b is supported on the elastic member 550c, and may elastically press the inner surface 2113 of the first housing 211. The roller 550d may be disposed between the ball 550b and the elastic member 550c, and may enable rotation of the ball 550b. According to an embodiment, the roller 550d may include a plurality of balls. According to certain embodiments, any of various other members (e.g., a lubrication member) capable of reducing friction on the ball 550b may be utilized in place of the roller 550d. According to certain embodiments, the ball caster may have any of various other structures.

According to an embodiment, the plurality of second rolling elements 551, 552, 553, 554, 555, 556, 557, and 558 may reduce the frictional force (e.g., kinetic frictional force) between the ring plate 511 and the first housing 211 while maintaining a gap between the inner surface 2113 of the housing 211 and the ring plate 511.

Figure 6:
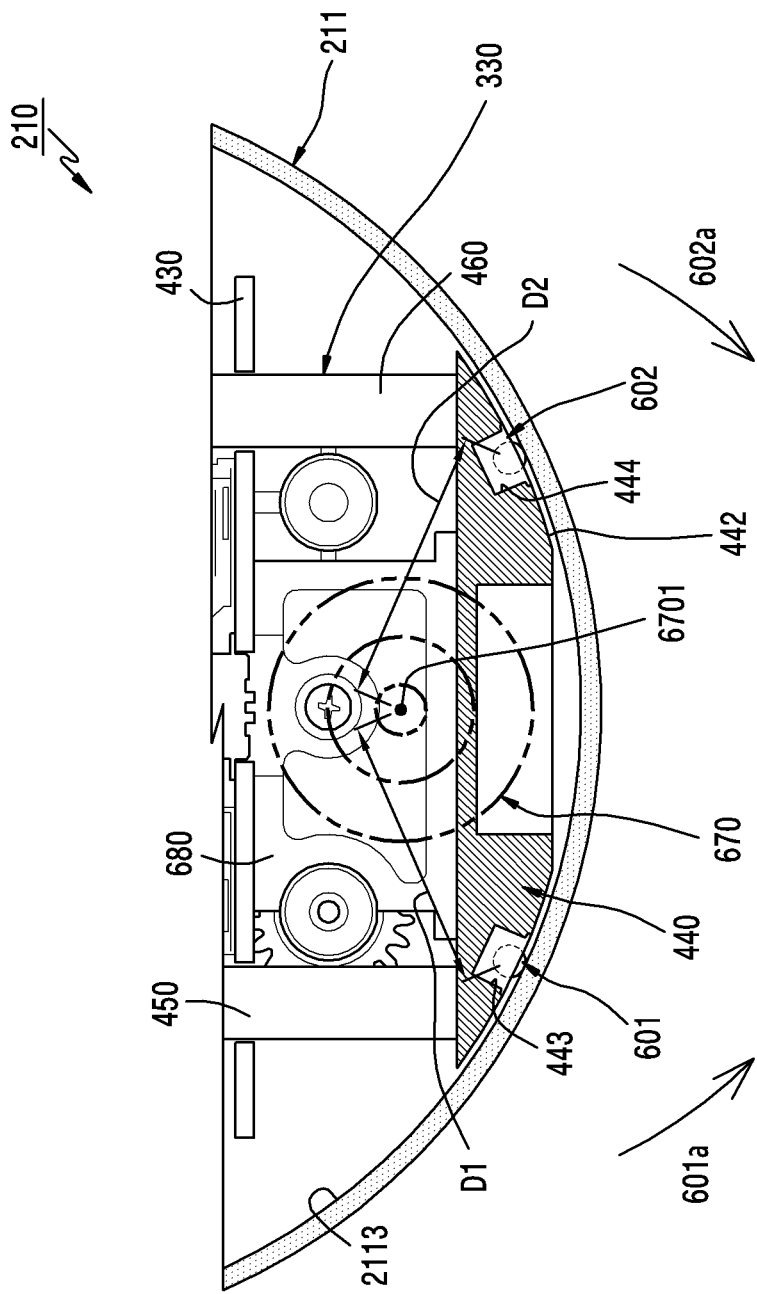
FIG. 6 is a cross-sectional view of a first device according to an embodiment.

FIG. 6 is a cross-sectional view of a first device according to an embodiment.

Referring to FIG. 6, the first device 210 may include at least one of a first housing 211, a first wheel 310, and a plurality of first rolling elements 601 and 602. The first driving device 330 is a device configured to transmit power to a wheel 670 (e.g., the first wheel 310 or the second wheel 320 in FIG. 3), and may include at least one of a printed circuit board 430, a first plate 440, a second plate 450, a support member 680 (e.g., the first support member 412 or the second support member 422 in FIG. 3) or power transmission elements (not illustrated). Since the first driving device 330 is substantially the same as that of FIG. 3, a detailed description thereof will be omitted.

According to an embodiment, the plurality of first rolling elements 601 and 602 may mean any of various elements that enable a rolling motion between the rear surface 442 of the first housing 221 and the inner surface 2113 of the first housing 211. According to an embodiment, the first plate 440 may include a rear surface 442 that faces the inner surface 2113 of the first housing 211. According to an embodiment, the plurality of first rolling elements 601 and 602 may be disposed on the rear surface 442 of the first plate 440. For example, the first plate 440 may include a first recess 443 and a second recess 444 formed in the rear surface 442 thereof. One first rolling element 601 may be inserted into the first recess 443 and the other first rolling element 602 may be inserted into the second recess 444.

According to an embodiment, the first rolling element 601 or 602 may include a ball caster. For example, the first rolling element 601 or 602 may include a ball rollable on the inner surface 2113 of the first housing 211. According to certain embodiments, the first rolling element 601 or 602 may have a structure for elastically pressing the ball against the inner surface 2113 of the first housing 211 (e.g., an elastic structure). According to some embodiments, a sliding member may be used in place of the first rolling element.

According to an embodiment, the plurality of rolling elements 601 and 602 may support the first housing 211, which rotates relative to the first driving device 330, while maintaining a gap between the rear surface 442 of the first plate 440 and the inner surface 2113 of the housing 211. For example, assuming that the plurality of first rolling elements 601 and 602 do not exist, the first driving device 330 may be tilted about the axis of rotation 6701 of a wheel 670 (e.g., the axis of rotation 3101 or the axis of rotation 3201 in FIG. 3) due to an inertia moment or reaction in the same situation as that when the first device 210 moves. As a result, the rear surface 442 of the first plate 440 may come into contact with the inner surface 2113 of the first housing 211. When the rear surface 442 of the first plate 440 comes into contact with the inner surface 2113 of the first housing 211, the frictional force generated therefrom may deteriorate, for example, the driving efficiency of the first driving device 330 or may make the movement of the first device 210 unstable.

According to an embodiment, the one first rolling element 601 may be disposed at a first position of the rear surface 442 of the first plate 440 so as to cancel out the moment tending to rotate the first driving device 330 counterclockwise (601a) about the axis of rotation 6701 of the wheel 670. The other first rolling element 602 may be disposed at a first position of the rear surface 442 of the first plate 440 so as to cancel out the moment tending to rotate the first driving device 330 clockwise (602a) about the axis of rotation 6701 of the wheel 670.

According to an embodiment, when viewed in cross section, a first distance D1 between the one first rolling element 601 and the axis of rotation 6701 of the wheel and a second distance D2 between the other first rolling element 602 and the axis of rotation 6701 of the wheel may be substantially the same. According to some embodiments, the first distance D1 and the second distance D2 may be different from each other.

Figure 7:
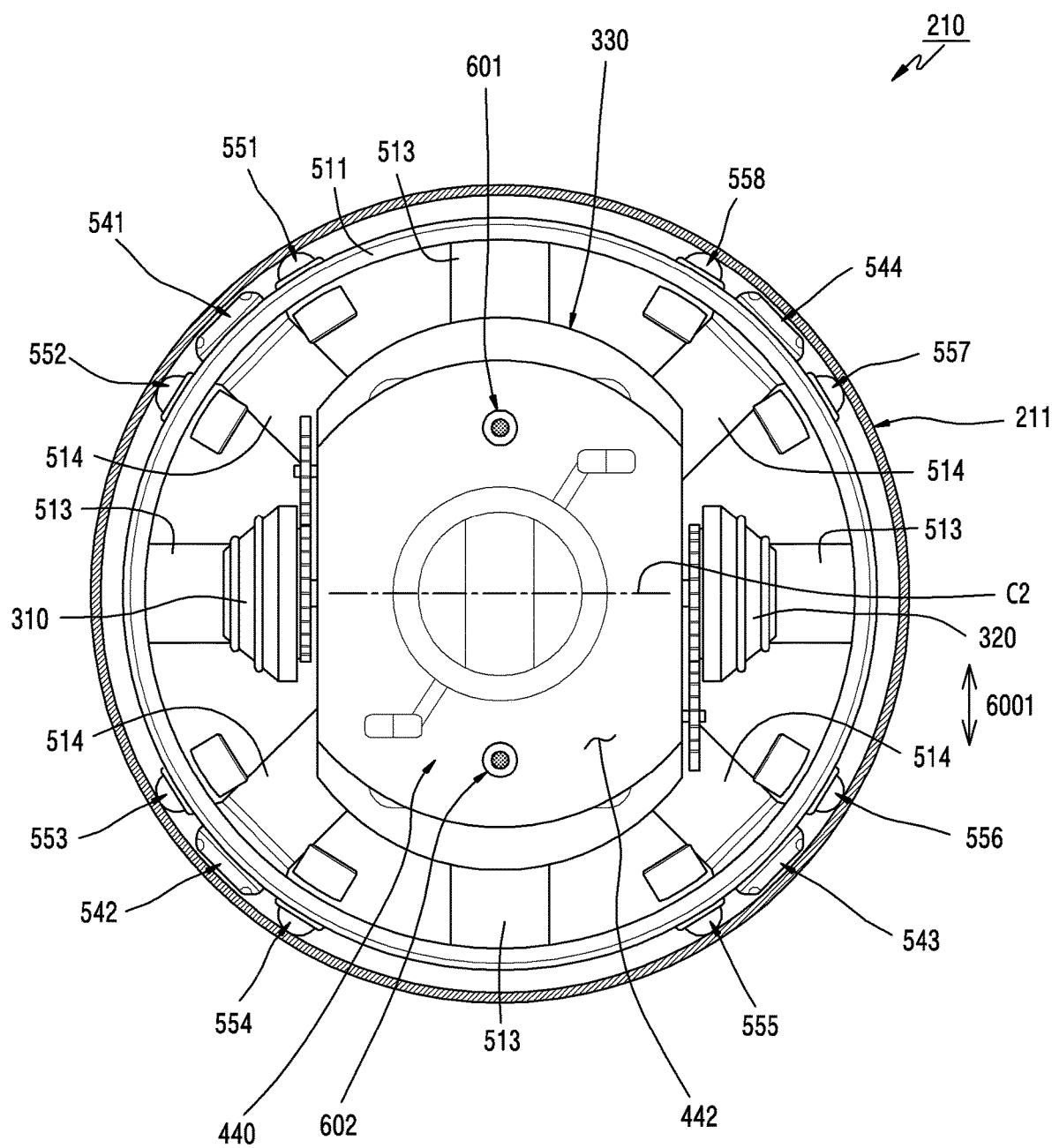
FIG. 7 is a partial cross-sectional view of a first device according to an embodiment.

FIG. 7 is a partial cross-sectional view of a first device according to an embodiment.

Referring to FIG. 7, the first device 210 may include at least one of a first housing 211, a first wheel 310, a second wheel 320, a first driving device 330, a ring plate 511, a plurality of first magnets 541, 542, 543, and 544, a plurality of second rolling elements 551, 552, 553, 554, 555, 556, 557, and 558, or a plurality of first rolling elements 601 and 602. Since the first housing 211, the first wheel 310 or the second wheel 320, the first driving device 330, and the ring structure 510 are substantially the same as those illustrated in FIG. 3, detailed descriptions thereof will be omitted. Since the ring structure 510 may include the ring plate 511 and the plurality of ribs 513 and 514, and the plurality of first magnets 541, 542, 543, and 544 disposed on the ring plate 511 and the plurality of second rolling elements 551, 552, 553, 554, 555, 556, 557, and 558 are substantially the same as those illustrated in FIG. 3, descriptions thereof will be omitted.

According to an embodiment, the plurality of first rolling elements 601 and 602 may be disposed on the rear surface 442 of the first plate 440 of the first driving device 330. According to an embodiment, when viewing the first device 210 such that the rear surface 442 of the first plate 440 is visible as shown, the plurality of first rolling elements 601 and 602 may be respectively disposed at the opposite sides of the axis of rotation C2 (e.g., the axis of rotation 3101 or 3201 in FIG. 3) of the first wheel 310 and the second wheel 320.

According to an embodiment, when viewing the first device 210 such that the rear surface 442 of the first plate 440 is visible, the plurality of first rolling elements 601 and 602 may be arranged in a direction 6001 orthogonal to the axis of rotation C2.

According to certain embodiments, the positions or number of the first rolling elements may vary, and are not limited to the example illustrated in FIG. 7.

Figure 8:
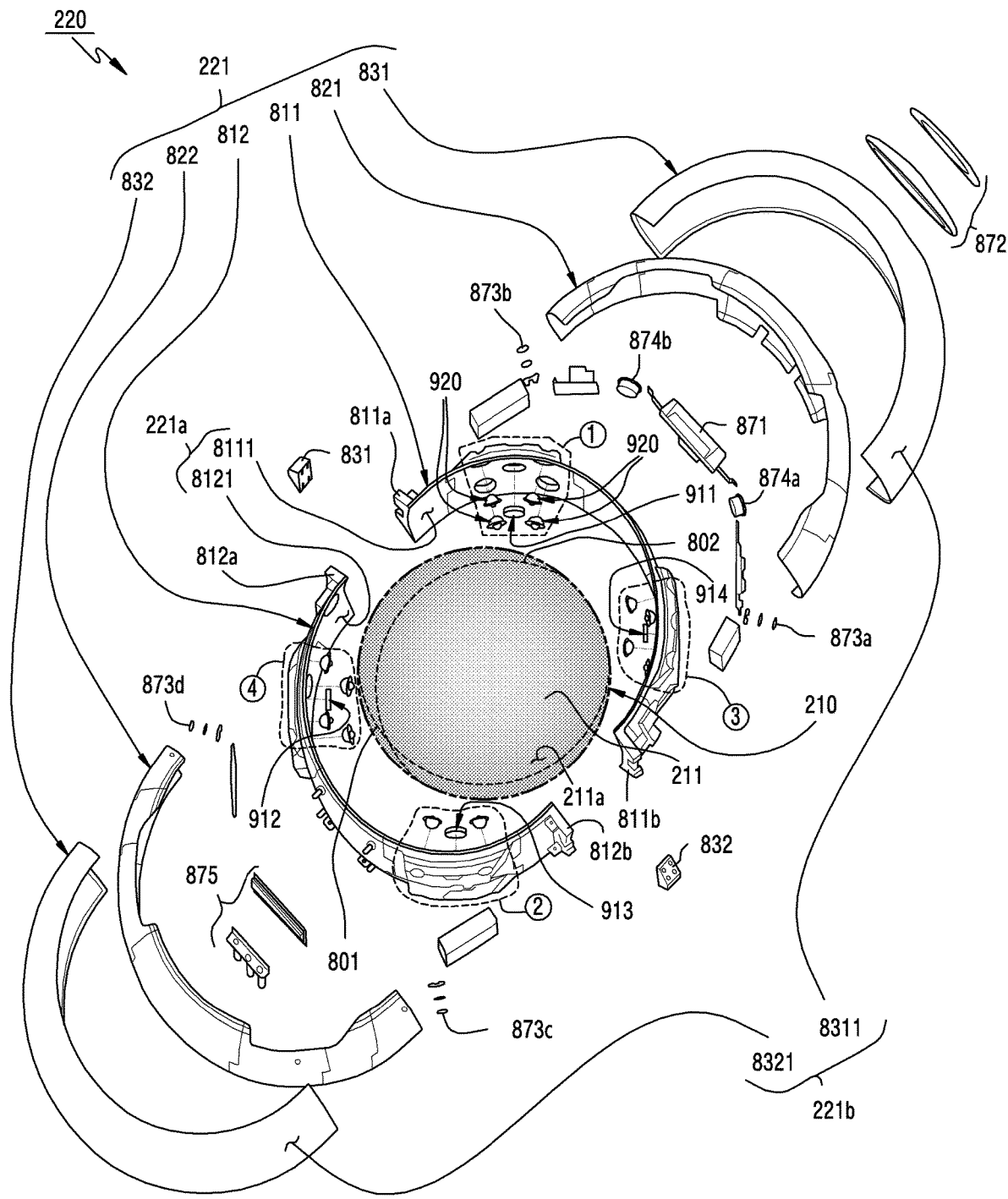
FIG. 8 is an exploded perspective view of a second device according to an embodiment.

FIG. 8 is an exploded perspective view of a second device according to an embodiment.

Referring to FIG. 8, in an embodiment, the second device 220 may include an annular second housing 221. For example, the second housing 221 may include an inner peripheral surface 221a and an outer peripheral surface 221b disposed along a great circle 801 (e.g., the great circle 211b of FIG. 2A) of the spherical surface 211a of the first device 210. When the second device 220 is coupled to the first device 210, the inner peripheral surface 221a may face the spherical surface 211a of the first device 210 not to be exposed to the outside, and the outer peripheral surface 221b may be exposed to the outside to form a part of the appearance of the second device 220. According to an embodiment, the second housing 221 may include at least one of a first plate 811, a second plate 812, a first inner cover 821, a second inner cover 822, a first outer cover 831, or a second outer cover 832.

According to an embodiment, the first plate 811 may be curved extending along one side (semicircle) of the first great circle 801 (e.g., the great circle 211b in FIG. 2A) of the spherical surface 211a. The first plate 811 may be curved extending from the first great circle 801 along a part of a second great circle 802 orthogonal to the first great circle 801. The first plate 811 may form one side 8111 of the inner peripheral surface 221a of the second housing 221. The second plate 812 may be disposed opposite the first plate 811 and coupled to the first plate 811, and may have a shape at least similar to that of the first plate 811. The second plate 812 may form the other side 8121 of the inner peripheral surface 221a of the second housing 221. One end portion 811a of the first plate 811 and one end portion 812a of the second plate 812 are coupled to each other by the first member, and the other end portion 811*b* of the first plate 811 and the other end portion 812*b* of the second plate 812 may be coupled to each other by a second member.

According to an embodiment, the first inner cover 821 may extend along the one side (semicircle) of the first great circle 801 (e.g., the great circle 211*b* in FIG. 2A) of the spherical surface 211*a*, and may be coupled to the first plate 811. The second inner cover 822 may extend along the other side (semicircle) of the first great circle 801 of the spherical surface 211*a*, and may be coupled to the second plate 812.

According to an embodiment, the first outer cover 831 may extend along the one side (semicircle) of the first great circle 801 (e.g., the great circle 211*b* in FIG. 2A) of the spherical surface 211*a*. The first outer cover 831 may form one side 8311 of the outer peripheral surface 221*b* of the second housing 221. The second outer cover 832 may extend along the other side (semicircle) of the first great circle 801 of the spherical surface 211*a*. The second outer cover 832 may form the other side 8321 of the outer peripheral surface 221*b* of the second housing 221. According to some embodiments, the first outer cover 831 and the first inner cover 821 or the second outer cover 832 and the second inner cover 822 may be integrally formed, and may include the same material.

According to an embodiment, various electronic components (e.g., a camera 871, a display 872, a plurality of microphones 873*a*, 873*b*, 873*c*, and 873*d*, a plurality of speakers 874*a* and 874*b*, wireless and/or wired charging module 875, or at least one sensor), at least partially disposed between the outer peripheral surface 221*b* and the inner peripheral surface 221*a*, between the first plate 811 and the first inner cover 821, or between the second plate 812 and the second inner cover 822, may be included. According to certain embodiments, the positions or number of the electronic components may vary, and are not limited to the example illustrated in FIG. 8.

According to an embodiment, at least one electronic component may be disposed on the first face of the second plate 812. For example, a printed circuit board (e.g., a rigid printed circuit board or a flexible printed circuit) for wiring between electronic components or mounting of electronic components may be disposed on the first plate 811 or the second plate 812.

According to an embodiment, at least one electronic component may be disposed on the first inner cover 821 or the second inner cover 822. For example, the camera 871 may be disposed in an opening (not illustrated) formed in the first inner cover 821 or on one surface of the first inner cover 821 facing the first outer cover 831.

According to an embodiment, at least one electronic component may be disposed on the first outer cover 831 or the second outer cover 832. For example, the display (or a light-emitting element (e.g., a light-emitting diode (LED)) 872 may be disposed on the first outer cover 831 to be exposed through the outer peripheral surface of the first outer cover 831.

According to certain embodiments, the second device 220 may include at least one antenna. The at least one antenna may transmit or receive a signal or power to or from the outside (e.g., the electronic device 102 or 104 in FIG. 1). According to an embodiment, the second device 220 may transmit or receive a signal or power to or from a second device (e.g., the first device 210 in FIG. 2A) coupled therewith via at least one antenna. According to certain embodiments, a power management module (e.g., the power management module 188 in FIG. 1) disposed in the second device 220 may charge the battery (e.g., the battery 189 in FIG. 1) disposed in the second device 220 using external power wirelessly transmitted through at least one antenna. According to an embodiment, the at least one antenna may be formed of a conductor or a conductive pattern. According to an embodiment, the at least one antenna may be utilized in a short range wireless communication network (e.g., the first network 198 in FIG. 1) or a long range wireless communication network (e.g., the second network 199 in FIG. 1).

According to certain embodiments, the second device 220 may include a connection terminal (e.g., the connection terminal 178 in FIG. 1) such as a connector capable of being physically connected to an external electronic device (e.g., the electronic device 102). According to an embodiment, the connection terminal may include, for example, an HDMI connector, a USB connector, an SD card connector, or an audio connector. According to certain embodiments, the connection terminal may be used for wired charging of the electronic device 220. For example, the power management module (e.g., the power management module 188 in FIG. 1) disposed in the second device 220 may charge the battery (e.g., the battery 189 in FIG. 1) disposed in the second device 220 using external power transmitted through the connection terminal.

According to an embodiment, the second device 220 may include a plurality of second magnets 911, 912, 913, and 914 disposed at regular intervals along the circumference of the inner peripheral surface 221*a*. For example, the plurality of second magnets 911, 912, 913, and 914 may be disposed respectively in the recesses 5111 or through holes (not illustrated) formed in the inner peripheral surface 221*a*. The plurality of second magnets 911, 912, 913, and 914 may be aligned with the first magnets (e.g., the plurality of first magnets 541, 542, 543, and 544 in FIG. 3) of the first device 210. Thus, between the first device 210 and the second device 220, force for pulling each other (attractive force) may act with the first housing 211 interposed therebetween. When the second driving device (e.g., the second driving device 340 in FIG. 3) having the first magnets disposed therein performs a rotation motion or a tilting motion, the second device 220 may also perform the rotation motion (e.g., the rotation motion 201 in FIG. 2A) or the tilting motion (e.g., the tilting motion 202 in FIG. 2A) due to the attractive force between the plurality of first magnets and the plurality of second magnets 911, 912, 913, and 914.

According to an embodiment, the second device 220 may include a plurality of third magnets disposed on the inner peripheral surface 221*a*. For example, the plurality of third magnets may be disposed respectively in the recesses or through holes (not illustrated) formed in the inner peripheral surface 221*a*. For example, the third rolling elements may mean any of various elements that enable a rolling motion between the first device 210 and the second device 220. The plurality of third rolling elements may reduce the frictional force between the second device 220 and the first housing 211. The plurality of third rolling elements may reduce energy loss caused due to friction (e.g., kinetic friction) that occurs when the second device 220 moves on the first housing 211.

According to an embodiment, referring to a first portion Î of the first plate 811, four third rolling elements 920 may be arranged around one second magnet 911. According to an embodiment, the four third rolling elements 920 may be disposed at the same distance from the one second magnet 911. For example, the four third rolling elements 920 may form a rectangular arrangement (e.g., an arrangement in which the rolling elements 920 are respectively disposed at four vertices of a rectangle). The second plate 812 may include a second portion $\hat{2}$ facing the first portion $\hat{1}$, and the second portion $\hat{2}$ may also include one second magnet 913 and four third rolling elements arranged around the one second magnet 913. The first plate 811 may include a third portion $\hat{3}$ in which one second magnet 914 is disposed, and the third portion $\hat{3}$ may also include four third rolling elements arranged around the one second magnet 914. The second plate 812 may include a fourth portion $\hat{4}$ facing the third portion $\hat{3}$, and the fourth portion $\hat{4}$ may also include one second magnet 912 and four third rolling elements arranged around the one second magnet 913.

According to certain embodiments, the positions or number of the third rolling elements may vary, and are not limited to the example illustrated in FIG. 8.

According to an embodiment, the plurality of third rolling elements may include a ball caster. For example, the third rolling elements may include balls rollable on the spherical surface 211*a* of the first housing 211. According to certain embodiments, the third rolling elements may include a structure for elastically pressing the balls against the spherical surface 211*a* of the first housing 211. According to certain embodiments, in the third rolling elements, various other members may be utilized in place of the ball caster.

Figure 9:
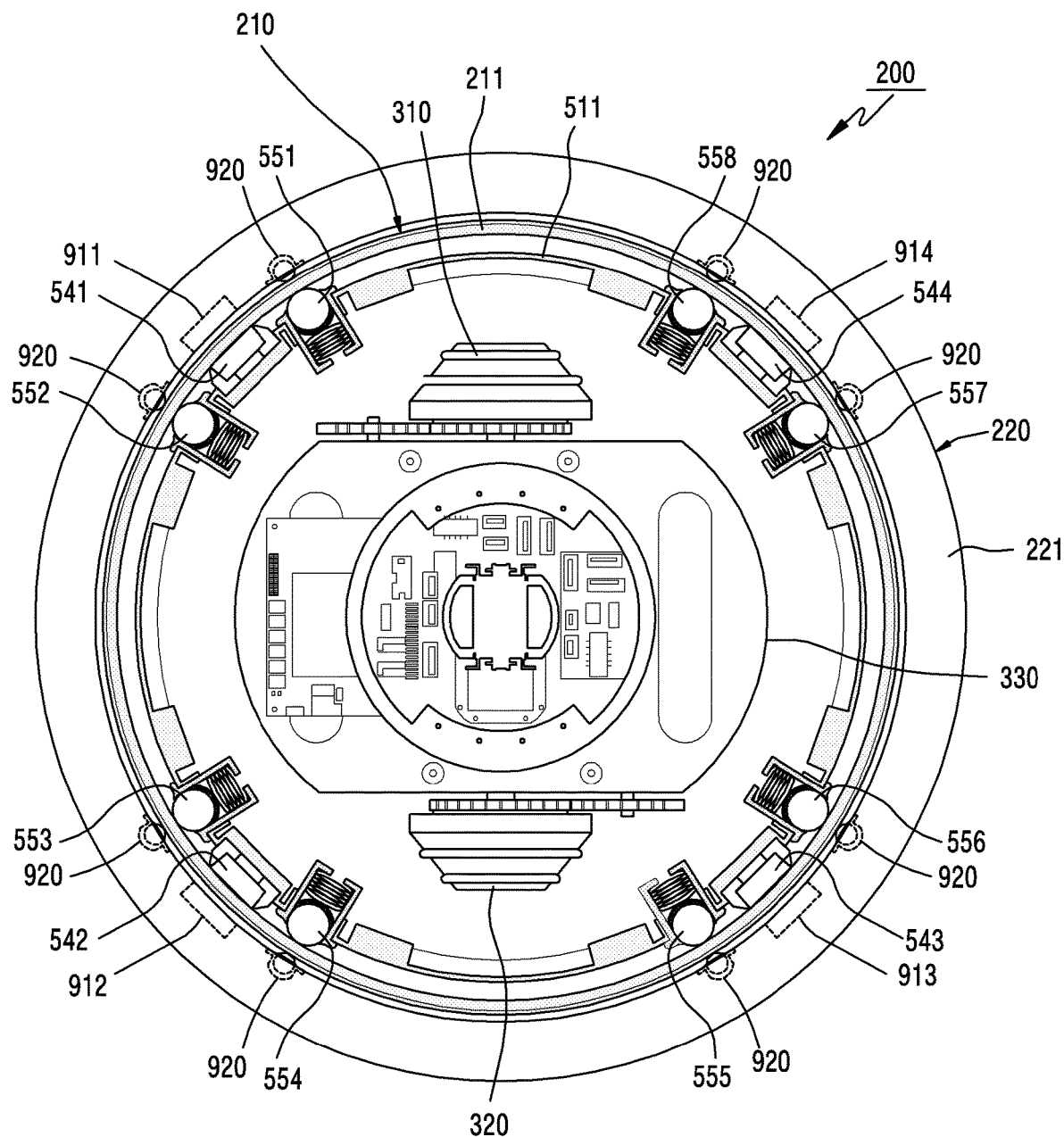
FIG. 9 is a partial cross-sectional view of an electronic device according to an embodiment.

FIG. 9 is a partial cross-sectional view of an electronic device according to an embodiment.

Referring to FIG. 9, in an embodiment, the electronic device 200 may include a first device 210 and a second device 220. The first device 210 may include a first housing 211, a first wheel 310, a second wheel 320, a first driving device 330, a ring plate 511, a plurality of first magnets 541, 542, 543, and 544, or a plurality of second rolling elements 551, 552, 553, 554, 555, 556, 557, and 558. Since these components are substantially the same as those illustrated in FIG. 3 or FIG. 5, detailed descriptions thereof will be omitted. The second device 220 may include a second housing 221, a plurality of second magnets 911, 912, 913, 914, and a plurality of third rolling elements 920. Since these components are substantially as those illustrated in FIG. 8, detailed description thereof will be omitted.

According to an embodiment, when the ring plate 511 performs a rotation motion or a tilting motion in the first housing 211 under the control of the first device 210, the second device 220 may also perform a rotation motion (e.g., the rotation motion 201 in FIG. 2A) or a tilting motion (e.g., the tilting motion 202 in FIG. 2A) on the second housing 221 due to the attractive force between the plurality of first magnets 541, 542, 543, and 544 and the plurality of second magnets 911, 912, 913, and 914. According to an embodiment, the plurality of third rolling elements 920 may reduce energy loss caused due to friction (e.g., kinetic friction) that occurs when the second device 220 moves on the first housing 211.

According to an embodiment, an electronic device (e.g., the first device 310 in FIG. 3) may include a spherical housing (e.g., the first housing 211 in FIG. 3) and a driving device (e.g., the first driving device 330 in FIG. 3) configured to cause a rolling motion of the spherical housing. The driving device may include: a first wheel (e.g., the first wheel 310 in FIG. 3) and a second wheel (e.g., the second wheel 320 in FIG. 3), which are in contact with the inner spherical surface (e.g., the inner spherical surface 2113 in FIG. 3) of the spherical housing and are respectively coupled at opposite sides of an axis of rotation; at least one motor (e.g., the first motor 413 or the second motor 423 in FIG. 3) configured to transmit power to the first wheel and/or the second wheel; a balance weight; and a first surface (e.g., the rear surface 442 in FIG. 6 or FIG. 7) disposed at a position spaced apart from the axis of rotation in a gravity direction by balancing of the balance weight and facing the inner spherical surface. The electronic device may include at least one rolling element (e.g., the plurality of first rolling elements 601 and 602 in FIG. 6 or FIG. 7) disposed between the inner spherical surface and the first surface.

According to an embodiment, the at least one rolling element may include a first rolling element (e.g., the rolling element 601 in FIG. 6 or FIG. 7) and a second rolling element (e.g., the rolling element 602 in FIG. 6 or FIG. 7) respectively disposed at opposite sides of the axis of rotation (e.g., the axis of rotation 6701 in FIG. 6 or the axis of rotation C2 in FIG. 7) when viewing the first surface (e.g., the rear surface 442 of FIG. 6 or FIG. 7).

According to an embodiment, the at least one rolling element may include a ball disposed on the first surface (e.g., the rear surface 442 in FIG. 6 or FIG. 7).

According to an embodiment, the at least one rolling element may further include an elastic member configured to elastically support the ball against the inner spherical surface.

According to an embodiment, the first surface (e.g., the rear surface 442 in FIG. 6 or FIG. 7) may include a curved surface that is at least partially complementary to the inner spherical surface (e.g., the inner surface 2113 in FIG. 6 or FIG. 7).

According to an embodiment, the electronic device may further include a second device (e.g., the second device 220 in FIG. 2A) disposed on the surface (e.g., the spherical surface 211*a* in FIG. 2A) of the spherical housing (e.g., the first housing 211 in FIG. 2A), a structure (e.g., the ring structure 510 in FIG. 3) disposed in the spherical housing to move with the second device, and a second driving device (e.g., the second driving device 340 in FIG. 3) configured to cause a motion of the structure.

According to an embodiment, the electronic device may further include at least one first magnet (e.g., included in the plurality of rolling elements 551, 552, 553, and 554 depicted in FIG. 3) disposed in the structure (e.g., the ring structure 510 in FIG. 3), and at least one second magnet (e.g., the plurality of second magnets 911, 912, 913, and 914 in FIG. 9) disposed in the second device (e.g., the second device 220 in FIG. 8). The structure and the second device are capable of moving together due to attractive force between the first magnet and the second magnet.

According to an embodiment, the electronic device may further include a plurality of second rolling elements (e.g., the plurality of rolling elements 551, 552, 553, 554, 555, 556, 557, and 558 in FIG. 3) disposed between the structure (e.g., the ring structure 510 in FIG. 3) and the inner spherical surface (e.g., the inner surface 2113 in FIG. 3).

According to an embodiment, each of the second rolling elements 551, 552, 553, 554, 555, 556, 557, and 558 may include a ball (e.g., the ball 550*b* in FIG. 5) disposed in the structure.

According to an embodiment, each of the second rolling elements 551, 552, 553, 554, 555, 556, 557, and 558 may further include an elastic member (e.g., the elastic member 550*c* in FIG. 5) configured to elastically support the ball (e.g., the ball 550*b* in FIG. 5) against the inner spherical surface (e.g., the inner surface 2113 in FIG. 5).

According to an embodiment, the structure may include a ring structure (e.g., the ring structure 510 in FIG. 3) including an annular surface disposed to face the inner spherical surface (e.g., the inner surface 2113 in FIG. 3) of the spherical housing 211a (e.g., the first housing 211 in FIG. 3).

According to an embodiment, the second device (e.g., the second device 220 in FIG. 2A) may have an annular shape and disposed along the annular surface.

According to an embodiment, the second driving device (e.g., the second driving device 340 in FIG. 3) may include at least one motor (e.g., the third motor 520 or the fourth motor 530 in FIG. 3) disposed between the ring structure (e.g., the ring structure 510 in FIG. 3). The second driving device connected to the first driving device (e.g., the first driving device 330) and the ring structure.

According to an embodiment, the second device (e.g., the second device 220 in FIG. 8) may include at least one of a camera (e.g., the camera 222 in FIG. 2A or the camera 871 in FIG. 8), a display (e.g., the display 872 in FIG. 8), a microphone (e.g., the plurality of microphones 873a, 873b, 873c, and 873d in FIG. 8), a speaker (e.g., the plurality of speakers 874a and 874b in FIG. 8), or a wireless communication circuit for wireless communication with the electronic device.

According to an embodiment, the electronic device may further include a plurality of third rolling elements (e.g., the third rolling elements 920 in FIG. 8 or FIG. 9) disposed between the second device (e.g., the second device 220 in FIG. 9) and the spherical housing (e.g., the first housing 211 in FIG. 9).

According to an embodiment, an electronic device (e.g., the electronic device 200 in FIG. 2A) may include a first device (e.g., the first device 210 in FIG. 2A) having a spherical housing (e.g., the first housing 211 in FIG. 2A) and an annular second device (e.g., the second device 220 in FIG. 2A) disposed on the surface of the spherical housing. The first device may include a first driving device (e.g., the first driving device 330 in FIG. 3) disposed in the spherical housing and configured to cause a rolling motion of the spherical housing, a ring structure (e.g., the ring structure 510 in FIG. 3) disposed in the spherical housing and facing the inner spherical surface (e.g., the inner surface 2113 in FIG. 3) of the spherical housing so as to move with the second device, a second driving device (e.g., the second driving device 340 in FIG. 3) configured to cause a motion of the ring structure; and a plurality of first rolling elements (e.g., the plurality of second rolling elements 551, 552, 553, 553, 554, 555, 556, 557, and 558 in FIG. 3) disposed between the ring structure and the inner spherical surface.

According to an embodiment, each of the first rolling elements (e.g., the plurality of second rolling elements 551, 552, 553, 553, 554, 555, 556, 557, and 558 in FIG. 3) may include a ball caster disposed on the annular surface.

According to an embodiment, the electronic device may further include at least one first magnet (e.g., the plurality of first magnets 541, 542, 543, and 544 in FIG. 9) disposed in the ring structure (e.g., the ring plate 511 in FIG. 9); and at least one second magnet (e.g., the plurality of second magnets 911, 912, 913, and 914) disposed in the second device (e.g., the second device 220 in FIG. 9). The ring structure and the second device are capable of moving together due to attractive force between the first magnet and the second magnet.

According to an embodiment, the second device may include a plurality of second rolling elements (e.g., the plurality of third rolling elements 920 FIG. 8 or FIG. 9) disposed between the second device and the spherical housing.

According to an embodiment, the first driving device (e.g., the first driving device 330 in FIG. 3) may include a first wheel (e.g., the first wheel 310 in FIG. 3) and a second wheel (e.g., the second wheel 320 in FIG. 3), which are in contact with an inner spherical surface of the spherical housing (e.g., the first housing 211 in FIG. 3) and are respectively coupled at opposite sides of an axis of rotation, at least one motor (e.g., the first motor 413 and the second motor 423 in FIG. 3) configured to transmit power to the first wheel and/or the second wheel, a balance weight, a first surface (e.g., the rear surface 442 in FIG. 6 or FIG. 7) disposed at a position spaced apart from the axis of rotation in a gravity direction by balancing of the balance weight and facing the inner spherical surface, and at least one third rolling element (e.g., the plurality of first rolling elements 601 and 602 in FIG. 6 or FIG. 7) disposed between the inner spherical surface and the first surface.

The embodiments of the disclosure disclosed in the specification and the drawings are only particular examples proposed in order to easily describe the technical matters of the disclosure and help with comprehension of the disclosure, and do not limit the disclosure. Therefore, in addition to the embodiments disclosed herein, the embodiments of the disclosure should be construed to include all modifications or modified forms drawn based on the technical idea of the embodiments of the disclosure.

What is claimed is:

1. An electronic device, comprising:
   a spherical housing; and
   a first driving device disposed in the spherical housing and configured to cause a rolling motion of the spherical housing, the first driving device including:
   first and second wheels contacting an inner spherical surface of the spherical housing, the first and second wheels respectively disposed at opposite sides of an axis of rotation;
   at least one motor configured to transmit power to the at least one of the first wheel and the second wheel;
   a balance weight;
   a first surface that is spaced apart from the axis of rotation in a direction of gravity by balancing of the balance weight, and facing the inner spherical surface;
   at least one rolling element disposed between the inner spherical surface and the first surface;
   a second device disposed on a surface of the spherical housing;
   a structure disposed in the spherical housing and configured to move with movement of the second device;
   a second driving device configured to drive a motion of the structure; and
   a plurality of second rolling elements disposed between the structure and the inner spherical surface.

2. The electronic device of claim 1, wherein the at least one rolling element includes a first rolling element and a second rolling element respectively disposed at opposite sides of the axis of rotation.

3. The electronic device of claim 1, wherein the first surface includes a curved surface that at least partially complements the inner spherical surface.

4. The electronic device of claim 1, further comprising:
   at least one first magnet disposed in the structure; and
   at least one second magnet disposed in the second device, wherein the structure and the second device are configured to move together as a result of an attractive force generated between the first magnet and the second magnet.

5. The electronic device of claim 1, wherein the second device includes at least one of a camera, a display, a microphone, a speaker, and a wireless communication circuit for wireless communication with external electronic devices.

6. The electronic device of claim 1, further comprising:
a plurality of third rolling elements disposed between the second device and the spherical housing.

7. The electronic device of claim 1, wherein the at least one rolling element includes a ball disposed on the first surface.

8. The electronic device of claim 7, wherein the at least one rolling element further includes an elastic member that maintains contact of the ball against the inner spherical surface.

9. The electronic device of claim 1, wherein each of the second rolling elements includes a ball disposed in the structure.

10. The electronic device of claim 9, wherein each of the second rolling elements further includes an elastic member configured maintain contact of the ball against the inner spherical surface.

11. The electronic device of claim 1, wherein the structure includes a ring structure having an annular surface disposed facing the inner spherical surface of the spherical housing.

12. The electronic device of claim 11, wherein the second device has an annular shape, and is disposed along the annular surface.

13. The electronic device of claim 11, wherein the second driving device includes at least one motor disposed between the ring structure and the first driving device, the at least one motor connected to the ring structure.

14. An electronic device, comprising:
a first device including a spherical housing; and
an annular second device disposed on a surface of the spherical housing;
wherein the first device includes:
a first driving device disposed in the spherical housing and configured to cause a rolling motion of the spherical housing;
a ring structure disposed in the spherical housing, facing an inner spherical surface of the spherical housing to move with the second device;
a second driving device configured to cause a motion of the ring structure; and
a plurality of first rolling elements disposed between the ring structure and the inner spherical surface.

15. The electronic device of claim 14, wherein the first rolling elements include a ball caster disposed on an annular surface.

16. The electronic device of claim 14, further comprising:
at least one first magnet disposed in the ring structure; and
at least one second magnet disposed in the second device,
wherein the ring structure and the second device are configured to move together according to an attractive force generated between the first magnet and the second magnet.

17. The electronic device of claim 14, wherein the second device includes a plurality of second rolling elements disposed between the second device and the spherical housing.

18. The electronic device of claim 14, wherein the first driving device includes:
first and second wheels, which contact with an inner spherical surface of the spherical housing, and are respectively coupled at opposite sides of an axis of rotation;
at least one motor configured to transmit power to the first wheel and/or the second wheel;
a balance weight;
a first surface that is spaced apart from the axis of rotation in a direction of gravity by balancing of the balance weight, and facing the inner spherical surface; and
at least one third rolling element disposed between the inner spherical surface and the first surface.

* * * * *